United States Patent
Nakayama et al.

(10) Patent No.: US 10,161,376 B2
(45) Date of Patent: Dec. 25, 2018

(54) IGNITION CONTROL APPARATUS

(71) Applicant: DENSO CORPORATION, Kariya, Aichi-pref. (JP)

(72) Inventors: Satoru Nakayama, Kariya (JP);
Makoto Toriyama, Kariya (JP);
Akimitsu Sugiura, Kariya (JP);
Masahiro Ishitani, Kariya (JP); Yuuki Kondou, Kariya (JP)

(73) Assignee: DENSO CORPORATION, Kariya (JP)

( * ) Notice: Subject to any disclaimer, the term of this patent is extended or adjusted under 35 U.S.C. 154(b) by 321 days.

(21) Appl. No.: 14/893,740

(22) PCT Filed: May 20, 2014

(86) PCT No.: PCT/JP2014/063396
§ 371 (c)(1),
(2) Date: Nov. 24, 2015

(87) PCT Pub. No.: WO2014/189064
PCT Pub. Date: Nov. 27, 2014

(65) Prior Publication Data
US 2016/0102648 A1    Apr. 14, 2016

(30) Foreign Application Priority Data

May 24, 2013  (JP) ................. 2013-109656
Jul. 11, 2013  (JP) ................. 2013-145078
Jul. 25, 2013  (JP) ................. 2013-154603

(51) Int. Cl.
*F02P 9/00*       (2006.01)
*F02P 3/00*       (2006.01)
(Continued)

(52) U.S. Cl.
CPC ............. *F02P 9/002* (2013.01); *F02P 3/005* (2013.01); *F02P 3/0892* (2013.01); *F02P 5/145* (2013.01);
(Continued)

(58) Field of Classification Search
CPC ........ F02P 9/002; F02P 3/0892; F02P 5/1502; F02P 7/03; F02P 5/145; F02P 3/005; F02P 9/007; F02P 15/10
See application file for complete search history.

(56) References Cited

U.S. PATENT DOCUMENTS

| 4,462,363 A | * | 7/1984 | Nanjyo | ................. | F02P 5/1553 |
| | | | | | 123/406.56 |
| 6,142,130 A | * | 11/2000 | Ward | .................... | F02P 3/005 |
| | | | | | 123/606 |

(Continued)

FOREIGN PATENT DOCUMENTS

| DE | 10 2011 006 268 | 10/2012 |
| JP | 02-020466 | 6/1990 |

(Continued)

OTHER PUBLICATIONS

International Preliminary Report on Patentability dated Nov. 24, 2015 issued in corresponding International Application No. PCT/JP2014/063396 (11 pgs.)

(Continued)

*Primary Examiner* — Hung Q Nguyen
*Assistant Examiner* — Brian P Monahon
(74) *Attorney, Agent, or Firm* — Nixon & Vanderhye PC

(57) ABSTRACT

An ignition control apparatus for engines is provided. The ignition control apparatus is designed to control a switch to release energy stored in a capacitor during spark discharge, thereby supplying a primary current to an other end side opposite a one end of a primary winding of an ignition coil (Continued)

connected to a dc power supply. This provides the ignition control apparatus which is capable of minimizing an increase in size or manufacturing cost and stabilizing the state of combustion of an air-fuel mixture.

19 Claims, 22 Drawing Sheets

(51) Int. Cl.
  *F02P 5/145* (2006.01)
  *F02P 5/15* (2006.01)
  *F02P 7/03* (2006.01)
  *F02P 3/08* (2006.01)
  *F02P 15/10* (2006.01)

(52) U.S. Cl.
  CPC ............ *F02P 5/1502* (2013.01); *F02P 7/03* (2013.01); *F02P 9/007* (2013.01); *F02P 15/10* (2013.01); *Y02T 10/46* (2013.01)

(56) References Cited

U.S. PATENT DOCUMENTS

| | | | | |
|---|---|---|---|---|
| 7,121,270 | B1* | 10/2006 | Plotnikov | F02P 15/10 123/604 |
| 2002/0056445 | A1* | 5/2002 | Inagaki | F02P 3/0456 123/609 |
| 2002/0093372 | A1* | 7/2002 | Theobald | H03K 17/163 327/478 |
| 2003/0076111 | A1* | 4/2003 | Toriyama | G01N 27/62 324/459 |
| 2004/0200463 | A1* | 10/2004 | Ando | F02P 3/0435 123/630 |
| 2006/0027219 | A1* | 2/2006 | Ando | F02P 3/0554 123/618 |
| 2007/0138975 | A1* | 6/2007 | Suganuma | H05B 41/2883 315/291 |
| 2007/0175461 | A1 | 8/2007 | Wada et al. | |
| 2007/0181110 | A1* | 8/2007 | Toriyama | F02P 3/0552 123/637 |
| 2007/0267004 | A1* | 11/2007 | Yamauchi | F02P 3/0892 123/604 |
| 2008/0127937 | A1 | 6/2008 | Toriyama et al. | |
| 2013/0241609 | A1* | 9/2013 | Miyazawa | H03K 3/57 327/142 |
| 2015/0300312 | A1* | 10/2015 | Ferguson | F02P 5/15 123/406.12 |

FOREIGN PATENT DOCUMENTS

| | | |
|---|---|---|
| JP | 05-172029 | 7/1993 |
| JP | 11-159427 | 6/1999 |
| JP | 2000-199470 | 7/2000 |
| JP | 2001-32758 | 2/2001 |
| JP | 2002-195143 | 7/2002 |
| JP | 2006037822 A * | 2/2006 ............ F02P 3/0552 |
| JP | 2007-224795 | 9/2007 |
| JP | 2007-231927 | 9/2007 |
| JP | 2007-309148 | 11/2007 |
| JP | 2008045514 A * | 2/2008 |
| JP | 2008-138639 | 6/2008 |
| JP | 2011-174471 | 9/2011 |
| JP | 2014-206061 | 10/2014 |
| JP | 2014-206068 | 10/2014 |
| JP | 2014-218995 | 11/2014 |
| JP | 2014-218997 | 11/2014 |
| JP | 2015-014237 | 1/2015 |
| JP | 2015-017562 | 1/2015 |
| JP | 2015-063931 | 4/2015 |
| JP | 2015-200300 | 11/2015 |

OTHER PUBLICATIONS

International Search Report (2 pages) dated Aug. 26, 2014, issued in corresponding Japanese Application No. PCT/JP2014-063396 (2 pages).

* cited by examiner

COMPARATIVE EXAMPLE 1

COMPARATIVE EXAMPLE 1

$$f = \frac{1}{0.693(R2C1+R3C2)}$$

IGNITION CONTROL APPARATUS

This application is the U.S. national phase of International Application No. PCT/JP2014/063396 filed 20 May 2014, which designated the U.S. and claims priority to JP Patent Application No. 2013-109656 filed May 24, 2013, JP Patent Application No. 2013-145078 filed 11 Jul. 2013, and JP Patent Application No. 2013-154603 filed 25 Jul. 2013, the entire contents of each of which are hereby incorporated by reference.

TECHNICAL FIELD

The present invention generally relates to an ignition control apparatus working to control an operation of a spark plug which ignites an air-fuel mixture within a cylinder of an internal combustion engine.

BACKGROUND ART

Various types of ignition control apparatuses for internal combustion engines are proposed which are designed to stabilize a combustion state of an air-fuel mixture. For instance, Japanese Patent First Publication No. 2007-231927 discloses an ignition control apparatus which intermittently produces a plurality of discharges in one combustion stroke. Japanese Patent First Publication No. 2000-199470 teaches two ignition coils joined parallel to each other in order to secure a multiple discharge characteristic which provides a longer discharge duration. Japanese Patent First Publication No. 11-159427 discloses an ignition control apparatus which is capable of applying to a spark plug an auxiliary voltage developed by a DC/DC converter connected to a low voltage side of a secondary coil of an ignition coil in addition to voltage created by the secondary coil.

SUMMARY OF THE INVENTION

Technical Problem

When a plurality of discharges are, like in the structure taught in Japanese Patent First Publication No. 2007-231927, developed intermittently in one combustion stroke, it will cause a spark discharge current to be zero a number of times between start and end of discharge of sparks within the combustion stroke. This results in so-called blow-off of the flame especially when a gas velocity is great in the cylinder, thus leading to a loss of ignition energy.

In the ignition control apparatus which, like in Japanese Patent First Publication No. 2000-199470, has two parallel-connected ignition coils, the spark discharge current will not to be zero between start and end of discharge of sparks within one combustion stroke, but the structure of the apparatus will be complicate, and the size thereof will also be increased. Such techniques will cause the structure (size) of the apparatus to be too big for the energy required for the ignition, thus leading to a problem that unwanted consumption of energy will be caused.

In the ignition control apparatus which is, like in Japanese Patent First Publication No. 11-159427, designed to apply the auxiliary voltage to the secondary coil, it is required for a circuit generating the auxiliary voltage to have a high voltage resistance. This will also lead to concern about the size or manufacturing cost.

The invention was made in view of the above problems. It is an object of the invention to provide an ignition control apparatus for internal combustion engines which is capable of minimizing the size or manufacturing cost thereof and stabilizing the state of combustion of an air-fuel mixture.

Japanese Utility Model Second Publication No. 2-20466 discloses a typical inductive discharge ignition control apparatus and an ignition control apparatus for internal combustion engines which is equipped with an DC-DC converter which supplies ignition energy to a secondary side of an ignition coil, an operation pausing means which stops the operation of the DC-DC converter, and an operation pause canceling means which cancels the holding of the operation when a given driving condition is detected.

The above ignition control apparatus is, however, required to use a high-voltage resistive device in the DC-DC converter installed on the secondary side of the ignition coil, thereby resulting in increases in manufacturing cost and size thereof in terms of improvement of the voltage resistance and heat dissipation and also causing the reliability to be deteriorated due to generation of heat in the high-voltage resistive device.

It is, therefore, an object of the invention to provide an ignition control apparatus for internal combustion engines at a decreased cost which is easy to install and highly reliable without need for use of a high-voltage resistive device.

Solution to Problem

An ignition control apparatus (30) of the invention is engineered to control an operation of a spark plug (19). The spark plug is provided to ignite an air-fuel mixture within a cylinder (11b) of an internal combustion engine (11). The ignition control apparatus of the invention is equipped with an ignition coil (311), a dc power supply (312), a first switching device (313), a second switching device (314), a third switching device (315), and an energy storage coil (316), a capacitor (317), and a controlling portion (319).

The ignition coil is equipped with a primary winding (311a) and a secondary winding (311b). The secondary winding is connected to the spark plug. The ignition coil is designed so that a primary current that is an electric current flowing through the primary winding is increased or decreased to develop a secondary current in the secondary winding. The dc power supply (312) has a non-grounding output terminal connected to an end of the primary winding to have the primary current flow through the primary winding.

The first switching device is equipped with a first control terminal (313G), a first power supply terminal (313C), and a first grounding terminal (313E). The first switching device is a semiconductor switching device and designed to establish or block electric communication between said first power supply terminal and said first grounding terminal based on a first control signal inputted to said first control terminal. In the first switching device, the first power supply terminal is connected to the other end of said primary winding. The first grounding terminal is connected to a ground side.

The second switching device (314) is equipped with a second control terminal (314G), a second power supply terminal (314D), and a second grounding terminal (314S). The second switching device is a semiconductor switching device and is designed to establish or block electric communication between said second power supply terminal and said second grounding terminal based on a second control signal inputted to said second control terminal. In the second switching device, the second grounding terminal is connected to the other end of said primary winding.

The third switching device (315) is equipped with a third control terminal (315G), a third power supply terminal (315C), and a third grounding terminal (315E). The third switching device is a semiconductor switching device and designed to establish or block electric communication between said third power supply terminal and said third grounding terminal based on a third control signal inputted to said third control terminal. In the third switching device, the third power supply terminal is connected to said second power supply terminal of said second switching device. The third grounding terminal is connected to said ground side.

The energy storage coil is an inductor disposed in a power line connecting between said non-grounding output terminal of said dc power supply and said third power supply terminal of said third switching device. The energy storage coil works to store energy when said third switching device is turned on and discharge the stored energy when said third switching device is turned off.

The capacitor is connected in series with said energy storage coil between said non-grounding output terminal of said dc power supply and said ground side. The capacitor works to store the energy released from said energy storage coil when said third switching device is turned off.

The controlling portion is provided to control the second switching device and said third switching device. The controlling portion works to turn off said third switching device and turn on said second switching device during discharge of a spark from said spark plug, as initiated upon turning off of said first switching device. Specifically, the controlling portion operates the second switching device and the third switching device in the above way to release the energy from said capacitor and controls each of said switching devices to supply the released energy to said primary winding from said other end as energy which causes the primary current to flow in the primary winding. Particularly, in this invention, said controlling portion variably sets a duty factor of said second control signal.

Advantageous Effects of the Invention

A typical operation of the ignition control apparatus of the invention having the above structure will be described below. The first switching device is turned on, and the second switching device is turned off, thereby causing the primary current to flow in the primary winding. This charges the ignition coil. In this period, the third switching device is turned on, so that the energy is stored in the energy storage coil. The stored energy is released from the energy storage coil when the third switching device is turned off and then stored in the capacitor.

When the first switching device is turned off while the second switching device and the third switching device are in the off-state, it suddenly cuts the primary current now flowing through the primary winding. This causes a high voltage to be developed at the primary winding of the ignition coil and then stepped up by the secondary winding, thereby creating a high voltage at the spark plug to generate discharge. At this time, the high secondary current is produced in the secondary winding, thereby initiating the spark discharge at the spark plug.

After the spark discharge is initiated at the spark plug, the secondary current (which will also be referred to as a discharge current) approaches zero with time. However, in structure of the invention, the third switching device is turned off, while the second switching device is turned on (i.e., the second switching device is turned on while the third switching device is in the off-state) during the spark discharge, thereby releasing the energy from the capacitor.

The energy discharged from the capacitor is supplied to the primary winding from the other end thereof, so that the primary current flows through the primary winding. This ensures a good condition of the discharge current which is capable of maintaining the spark discharge. The state of flow of the discharge current during the spark discharge can be controlled optionally by adjustment of a released amount of the energy stored in the capacitor through turning on or off of the second switching device.

Accordingly, in the ignition control apparatus of this invention, the controlling portion works to variably set the duty factor of the second control signal (i.e., a duty cycle for turning on the second switching device). For instance, the controlling portion determines the duty factor according to the running condition of the internal combustion engine to keep the secondary current (i.e., the discharge current) greater than or equal to a given value. Specifically, the controlling portion increases the duty factor with time. In this case, the controlling portion may change a rate of the increase in duty factor with time.

With the above arrangements of the ignition control apparatus, it is possible to control the state of flow of the discharge current according to the state of flow of gas in the cylinder in order to avoid the occurrence of flame blow-off. Therefore, according to the invention, the occurrence of flame blow-off or a resulting loss of energy is controlled properly by a simple structure of the ignition control apparatus. In other words, according to the invention, an increase in size or manufacturing cost of the ignition control apparatus can be minimized, and the state of combustion of the air-fuel mixture can be stabilized.

Particularly, the energy is, as described above, inputted to the primary winding from the low voltage side (e.g., a grounding side or the first switching device), thereby enabling the input of energy to be achieved at a voltage lower than that when the energy is inputted from the secondary winding.

When the energy is inputted to the primary winding from a high voltage side (i.e., the dc power supply) at a voltage higher than voltage at the dc power supply, it results in deterioration in efficiency caused by current flowing into the dc power supply. In contrast to this, the invention offers beneficial advantages that the energy is, as described above, inputted to the primary winding from the low voltage side, thereby facilitating the ease with which the energy is inputted to the primary winding and improving the efficiency in inputting the energy.

An ignition control apparatus (407, 407a, 407b) of the invention at lease comprises: a dc power supply (410); a step-up circuit (401) which steps up a power supply voltage at the dc power supply (410); an ignition coil (404) which develops a high secondary voltage (V2) at a secondary winding (441) by an increase or a decrease in current flowing in the primary winding (440) connected to said step-up circuit (401); an ignition switching device (403) which switches between supply and cutoff of current to said primary winding (440); and a spark plug (405) which is connected to said secondary winding (441) and produces a spark discharge upon application of secondary voltage (V2) from said secondary winding (441), and works to ignite an internal combustion engine. The ignition control apparatus includes an auxiliary power supply (402) which additionally performs discharge of the ignition switching device from said step-up circuit (401) and stop the discharge, thereby increasing current flowing through said secondary winding (441) in order to input the energy which maintains the discharge after said spark plug (405) is started by opening or closing of said ignition switching device (403) to discharge. The auxiliary power supply (402) is equipped with an auxiliary switching device (420) which switches between input of energy from said auxiliary power supply (402) and stop thereof, said auxiliary switching device (420) includes a soft-off circuit (422, 422a, 421b) which works to set a turning off speed to be slower than a turning on speed.

According to the ignition control apparatus (407, 407a, 407b) of the invention, the soft-off circuit works to slowly stop inputting the discharge energy from the auxiliary power supply (402), thereby alleviating a sudden change in the secondary current (I2) to maintain a discharge path for a long period of time, which ensures the stability in igniting the mixture without wasting the input energy.

An ignition control apparatus of the invention at least comprises: a dc power supply (410); a step-up circuit (401) which steps up a power supply voltage at said dc power supply; an ignition coil (404) which develops a high secondary voltage (V2) at a secondary winding (441) by an increase or a decrease in current flowing in the primary winding (440) connected to said step-up circuit (401); an ignition switching device (403) which switches between supply and cutoff of current to said primary winding (440) according to an ignition signal (IGt) outputted as a function of a running condition of the internal combustion engine; a spark plug (405) which is connected to said secondary winding (441) and produces a spark discharge upon application of secondary voltage (V2) from said secondary winding (441), and works to ignite an internal combustion engine. The ignition control apparatus also includes an auxiliary power supply (402) which additionally performs discharge from said the step-up circuit (401) to a junction between the primary winding (440) of the ignition coil (404) and the ignition switching device (403) and then stop the discharge, thereby increasing current through said first winding (440) in order to input the energy which maintains the discharge after said spark plug (405) is started by opening or closing of said ignition switching device (403) to discharge. The auxiliary power supply (402) is equipped with an auxiliary switching device (420) which switches between discharge from said auxiliary power supply (402) and stop of the discharge, an auxiliary switching device driving circuit (421, 421a, 421b) which opens or closes the auxiliary switching device (420), and a frequency calculating portion (210, 210a, 210b) which increases or decreases a drive frequency for said auxiliary switching device (420) as a function of an engine parameter (EPr) indicative of a running condition of the internal combustion engine.

Specifically, the calculating portion (210, 210a, 210b) works to decrease a rate of increase in drive pulse frequency for said auxiliary switching device (420) as a speed of the internal combustion engine decreases or a load on the internal combustion engine decreases while keeping a drive duty factor for driving said auxiliary switching device, and alternatively to increase the rate of increase in the drive pulse frequency for opening or closing said auxiliary switching device (420) as the speed of the internal combustion engine increases or the load on the internal combustion engine increases according to the running condition of the internal combustion engine determined based on one or a plurality of engine parameters (EPr) selected from an engine speed (Ne), an intake pressure (PIN), an accelerator position (Th), a crank angle (CA), an engine coolant temperature (Tw), an EGR rate, an air-fuel ratio (A/F), a primary voltage (V1) at the ignition coil, a secondary voltage (V2) at the ignition coil, and a secondary current (I2) in the ignition coil.

In the discharge period of time between start of discharge and end of the discharge, a frequency of a drive pulse for driving said auxiliary switching device (420) is increased toward the end of the discharge.

According to the ignition control apparatus (407, 407a, 407b), it is possible for the frequency calculating portion to calculate the optimum drive frequency suitable for the running condition of the internal combustion engine to increase or decrease the drive frequency for the auxiliary switching device (420), thereby enabling the energy inputted from the auxiliary power supply (402) to the spark plug (405) to be increased or decreased. This maintains the discharge and ensures the stability in igniting the mixture without wasting the input energy.

According to the invention, the drive frequency is increased at the end of discharge where the flame blow-off occurs easily, especially in the running condition where a strong gas stream is occurring in a combustion chamber, thereby increasing the input energy from the auxiliary power supply (402) to minimize the occurrence of the flame blow-off and ensuring the stability in igniting the mixture.

DESCRIPTION OF EMBODIMENTS

The embodiments will be described below with reference to the drawings.

Structure of Engine System

Figure 1:
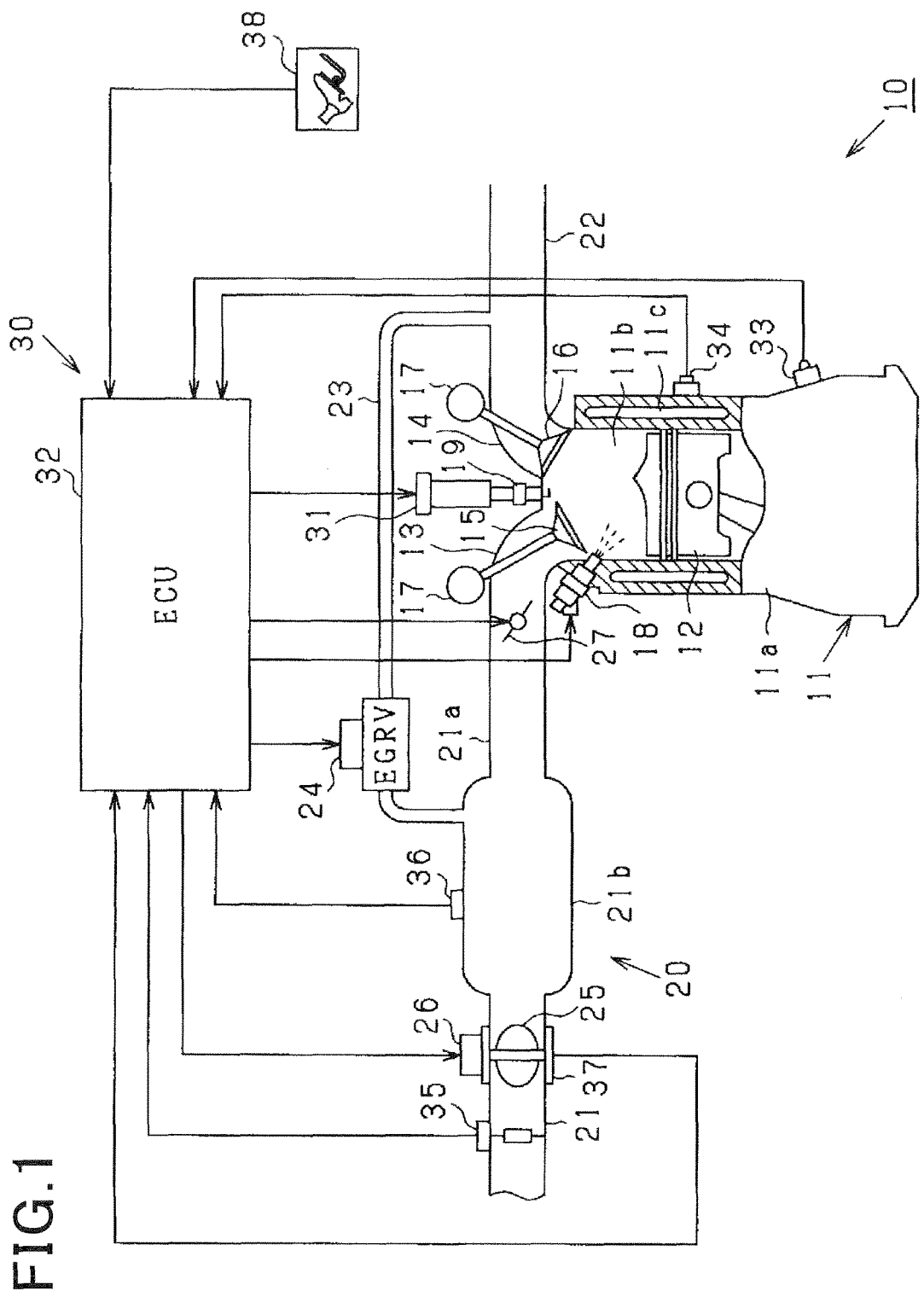
FIG. 1 is a schematic structural view of an engine system equipped with an ignition control apparatus in an embodiment of the invention.

Referring to FIG. 1, the engine system 10 is equipped with the engine 11 that is a spark-ignited internal combustion engine. In the engine block 10a which constitutes the body of the engine 11, the cylinder 11b and the water jacket 11c are formed. The cylinder 11b has installed therein the piston 12 to be reciprocable. The water jacket 11c is a space through which cooling liquid (also called cooling water) flows and which surrounds the periphery of the cylinder 11b.

A cylinder head that is an upper portion of the engine block 11a has formed therein the intake port 13 and the exhaust port 14 which are communicable with the cylinder 11b. In the cylinder head, the intake valve 15, the exhaust valve 16, and the valve drive mechanism 17 are installed. The intake valve 15 is capable of changing the state of communication between the intake port 13 and the cylinder 11b. The exhaust valve 16 is capable of changing the state of communication between the exhaust port 14 and the cylinder 11b. The valve drive mechanism 17 is designed to open or close the intake valve 15 and the exhaust valve 16 at given timings.

The injector 18 and the spark plug 19 are mounted in the engine block 11a. The injector 18 is installed to directly spray fuel into the cylinder 11b. The spark plug 19 is installed to ignite the air-fuel mixture in the cylinder 11b.

The supply and exhaust mechanism 20 is connected to the engine 11. The air supply and exhaust mechanism 20 is equipped with three kinds of gas paths: the intake pipe 21 (including the intake manifold 21a and the surge tank 21b), the exhaust pipe 22, and the EGR (Exhaust Gas Recirculation) passage 23.

The intake manifold 21a connects with the intake port 13. The surge tank 21b is located upstream of the intake manifold 21a in a direction of flow of intake air. The exhaust pipe 22 connects with the exhaust port 14.

The EGR passage 23 connects between the exhaust pipe 22 and the surge tank 21b to induct a portion of exhaust gas emitted into the exhaust pipe 22 to the intake air. The EGR passage 23 has the EGR valve 23 installed therein. The EGR valve 23 is installed to be capable of controlling an EGR rate (i.e., a mixture ratio of exhaust gas to gas sucked into the cylinder 11b before being burned) as a function of the degree of opening of the EGR valve 23.

The throttle valve 25 is disposed in the intake pipe 21 upstream of the surge tank 21b in the direction of flow of intake air. The throttle valve 25 is designed to have a degree of opening thereof controlled by an operation of a throttle actuator such as a DC motor. The gas flow control valve 27 is disposed near the intake port 13 to generate swirl and tumble flows.

The engine system 10 has the ignition control apparatus 30 installed therein. The ignition control apparatus 30 is engineered to control an operation of the spark plug 19 (i.e., perform ignition control in the engine 11). The ignition control apparatus 30 is equipped with the ignition circuit unit 31 and the electronic control unit 32.

The ignition circuit unit 31 is engineered to have the spark plug 19 produce a spark discharge to ignite the air-fuel mixture in the cylinder 11b. The electronic control unit 32 is a so-called engine ECU (Electronic Control Unit). The electronic control unit 32 works to control operations of parts including the injector 18 and the ignition circuit unit 31 as a function of operating conditions of the engine 11 (which will also be referred to as engine parameters below) derived by outputs from sensors such as the rotation speed sensor 33, etc.

The electronic control unit 32 performs the ignition control based on the derived engine parameters to produce and output the ignition signal IGt and the energy input duration IGw. The ignition signal IGt and the energy input duration IGw are to set an optimum ignition timing and an optimum discharge current (i.e., a spark discharge current) as a function of a state of gas in the cylinder 11b and a required output from the engine 11 (which will change as a function of the engine parameter). Such signals are well known, and explanation thereof in detail will be omitted here (see Japanese Patent First Publication No. 2002-168170 (U.S. Pat. No. 6,557,537 B2) as needed). Note that in these publications, IGw is referred to as a multispark duration signal or a discharge duration signal.

The rotation speed sensor 33 is a sensor which detects or obtains an engine speed Ne (also called the number of engine revolutions). The rotation speed sensor 33 is secured to the engine block 11a and produces a pulse output as a function of a rotation angle of a crankshaft not shown which rotates following reciprocating motion of the piston 12. The coolant temperature sensor 34 is a sensor which is installed in the engine block 11a and works to detect or obtain the coolant temperature Tw that is the temperature of cooling liquid flowing through the water jacket 11c.

The air flow meter 35 is a sensor which detects or obtains the intake air quantity Ga (i.e., a mass flow rate of the intake air inducted into the cylinder 11b through the intake pipe 21). The air flow meter 35 is installed in the intake pipe 21 upstream of the throttle valve 25 in the direction of flow of the intake air. The intake pressure sensor 36 is a sensor which detects or obtains the intake pressure Pa that is the pressure in the intake pipe 21 and is installed in the surge tank 21b.

The throttle position sensor 37 is a sensor which works to produce an output corresponding to a degree of opening (i.e., a throttle opening THA) of the throttle valve 25 and is installed in the throttle actuator 26. The accelerator position sensor 38 is designed to produce an output corresponding to a manipulated variable of an accelerator not shown (i.e., an accelerator manipulated variable ACCP).

Structure of Ignition Control Apparatus

Figure 2:
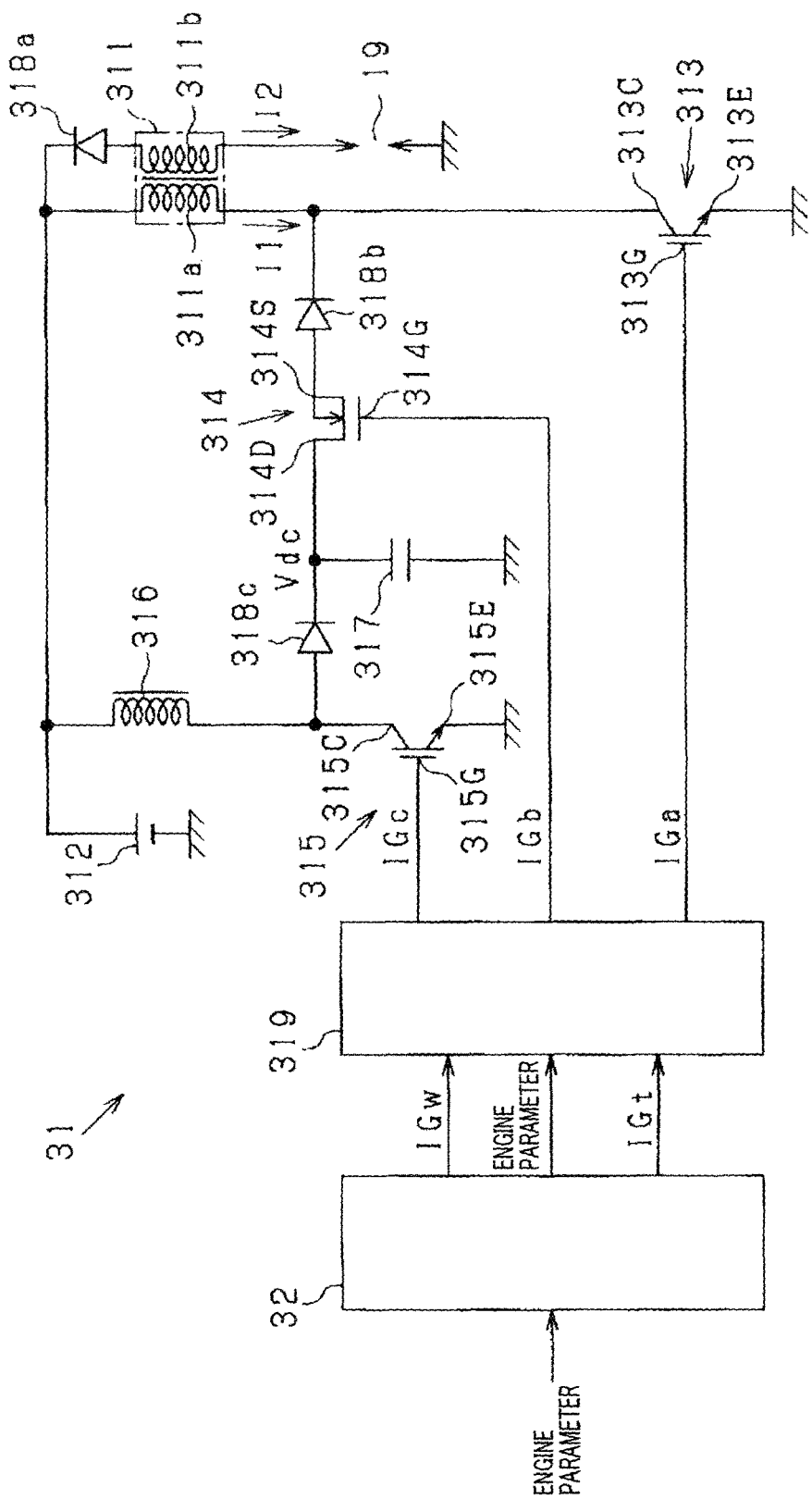
FIG. 2 is a schematic circuit diagram of the ignition control apparatus shown in FIG. 1.

Referring to FIG. 2, the ignition circuit unit 31 is equipped with the ignition coil 311 (including the primary winding 311a and the secondary winding 311b), the direct current power supply 312, the first switching device 313, the second switching device 314, the third switching device 315, the energy storage coil 316, the capacitor 317, the diodes 318a, 318b, and 318c, and the driver circuit 319.

The ignition coil 311 is, as described above, equipped with the primary winding 311a and the secondary winding 311b. The ignition coil 311 is, as well known, designed to develop a secondary current in the secondary winding 311b by increasing or decreasing of a primary current flowing through the primary winding 311a.

A non-grounded output terminal (i.e., a plus terminal) of the dc power supply 312 is connected to a high-voltage terminal (which will also be referred to as a non-grounding terminal) that is an end of the primary winding 311a. A low-voltage terminal (which will also be referred to as a grounding terminal) that is the other end of the primary winding 311a is connected to a ground side through the first switching device 313. Specifically, when the first switching device 313 is turned on, the dc power supply 312 produces a flow of the primary current from the high-voltage terminal to the low-voltage terminal of the primary winding 311a.

The high-voltage terminal (which will also be referred to as a non-grounding terminal) of the secondary winding 311b is joined to the high-voltage terminal of the primary winding 311a through the diode 318a. The diode 318a is connected at an anode thereof to the high-voltage terminal of the secondary winding 311b. Specifically, the diode 318a works to block a flow of current from the high-voltage terminal of the primary winding 311a to the high-voltage terminal of the secondary winding 311b and to direct the secondary current (i.e., the discharge current) from the spark plug 19 to the secondary winding 311b (i.e., in a direction in which the current I2 in the drawing has a negative value). The low-voltage terminal (which will also be referred to as a grounding terminal) of the secondary winding 311b is connected to the spark plug 19.

The first switching device 313 is an IGBT (Insulated Gate Bipolar Transistor) that is a MOS gate transistor) and equipped with the first control terminal 313G, the first power supply terminal 313C, and the first grounding terminal 313E. The first switching device 313 is engineered to block or establish electric communication between the first power supply terminal 313C and the first grounding terminal 313E based on the first control signal IGa inputted to the first control terminal 313G. The first power supply terminal 313C is connected to the low-voltage terminal of the primary winding 311a. The first grounding terminal 313E is connected to ground.

The second switching device 314 is an MOSFET (Metal Oxide Semiconductor Field Effect Transistor) and equipped with the second control terminal 314G, the second power supply terminal 314D, and the second grounding terminal 314S. The second switching device 314 is engineered to block or establish electric communication between the second power supply terminal 314D and the second grounding terminal 314S based on the second control signal IGb inputted to the second control terminal 314G.

The second grounding terminal 314S is connected to the low-voltage terminal of the primary winding 311a through the diode 318b. The diode 318b is connected at an anode thereof to the second grounding terminal 314S. Specifically, the diode 318b works to permit the current to flow from the second grounding terminal 314S of the second switching device 314 to the low-voltage terminal of the primary winding 311a.

The third switching device 315 is an IGBT (Insulated Gate Bipolar Transistor) that is a MOS gate transistor) and equipped with the third control terminal 315G, the third power supply terminal 315C, and the third grounding terminal 315E. The third switching device 315 is engineered to block or establish electric communication between the third power supply terminal 315C and the third grounding terminal 315E based on the third control signal IGc inputted to the third control terminal 315G.

In this embodiment, the third power supply terminal 315C is connected to the second power supply terminal 314D of the second switching device 314 through the diode 318c. The diode 318c is joined at an anode thereof to the third power supply terminal 315C. Specifically, the diode 318c works to permit the current to flow from the third power supply terminal 315C of the third switching device 315 to the second power supply terminal 314D of the second switching device 314. The third grounding terminal 315E of the third switching device 315 is connected to ground.

The energy storage coil 316 is an inductor disposed in an electric power line connecting between the above described non-grounding output terminal of the dc power supply 312 and the third power supply terminal 315C of the third switching device 315. The energy storage coil 316 works to store energy (i.e., electromagnetic energy) when the third switching device 315 is turned on and to discharge the stored energy when the third switching device 315 is turned off.

The capacitor 317 is connected in series with the energy storage coil 316 between a ground side and the non-grounding output terminal of the dc power supply 312. In other words, the capacitor 317 is joined to the energy storage coil 316 in parallel to the third switching device 315. The capacitor 317 works to store the energy discharged from the energy storage coil 316 when the third switching device 315 is turned off.

The driver circuit 319 functioning as a control portion is connected to the electronic control unit 32 to receive the engine parameter, the ignition signal IGt, and the energy input duration signal IGw outputted from the electronic control unit 32. The driver circuit 319 is connected to the first control terminal 313G, the second control terminal 314G, and the third control terminal 315G to control the operations of the first switching device 313, the second switching device 314, and the third switching device 315. The driver circuit 319 works to output the first control signal IGa, the second control signal IGb, and the third control signal IGc to the first control terminal 313G, the second control terminal 314G, and the third control terminal 315G based on the ignition signal IGt and the energy input duration signal IGw received.

Specifically, the driver circuit 319 works to turn off the third switching device 315 and turn on the second switching device 314 during discharge of a spark from the spark plug 19, as initiated upon turning off of the first switching device 313, thereby releasing the energy stored in the capacitor 317. In other words, the driver circuit 319 controls the switching devices in the above way to release the energy (i.e., electrostatic energy) from the capacitor 317 and supply it from the low-voltage terminal to the primary winding 311a as energy (which will be referred to as input energy below) to have the primary current flow through the primary winding 311a.

Particularly, in this embodiment, the driver circuit 319 is capable of changing the duty factor of the third control signal IGc as a function of the engine parameter. Specifically, the driver circuit 319 sets an on-duty factor of an output signal to the third switching device 315 as a function of the engine parameter, thereby variably controlling the amount of energy (i.e., electrostatic energy) stored in the capacitor 317.

In this embodiment, the driver circuit 319 works to variably set the duty factor of the second control signal IGb as a function of the engine parameter. Specifically, the driver circuit 319 sets an on-duty factor of an output signal to the second switching device 314 as a function of the engine parameter, thereby variably controlling the amount of energy to be supplied from the capacitor 317 to the low-voltage terminal of the primary winding 311a Specifically, in this embodiment, the driver circuit 319 increases the duty factor of the second control signal IGb as time proceeds in one combustion cycle to keep the discharge current higher than or equal to a given value in order to avoid the blow-off of flame due to an increase in flow velocity within the cylinder 11b. The driver circuit 319 also uses a map (i.e., a look-up table) shown in FIG. 3 to variably set a rate of increase in the duty factor ΔDUTY with time in one combustion cycle as a function of the intake pressure Pa and the engine speed Ne that are the engine parameters.

Description of Operation

The operation of the ignition control apparatus 20 of this embodiment and beneficial effects offered thereby will be described below. In time charts of FIGS. 4 and 5, Vdc indicates the voltage at the capacitor 317. "I1" indicates the primary current. "I2" indicates the secondary current.

In the drawings of the time charts, the primary current I1 and the secondary current I2 are illustrated as having positive values in a direction indicated by arrows in FIG. 2. The ignition signal IGt, the energy input duration signal IGw, the first control signal IGa, the second control signal IGb, and the third control signal IGc are high when they have been risen or low when they have been fallen.

The electronic control unit 32 works to control the operations of parts of the engine system 10 such as the injector 18, the ignition circuit unit 31, etc. as a function of the engine parameters derived from outputs from sensors such as the rotation speed sensor 33, etc. Explaining the ignition control in detail, the electronic control unit 32 produces the ignition signal IGt and the energy input duration signal IGw based on the derived engine parameters. The electronic control unit 32 then outputs the ignition signal IGt, the energy input duration signal IGw, and the engine parameters to the driver circuit 319.

Upon reception of the ignition signal IGt, the energy input duration signal IGw, and the engine parameters, as outputted from the electronic control unit 32, the driver circuit 319 outputs the first control signal IGa for turning on or off the first switching device 313, the second control signal IGb for turning on or off the second switching device 314, and the third control signal IGc for turning on or off the third switching device 315.

The first control signal IGa is the same as the ignition signal IGt. The driver circuit 319, therefore, outputs the received ignition signal IGt as the first control terminal 313G of the first switching device 313.

Figure 3:
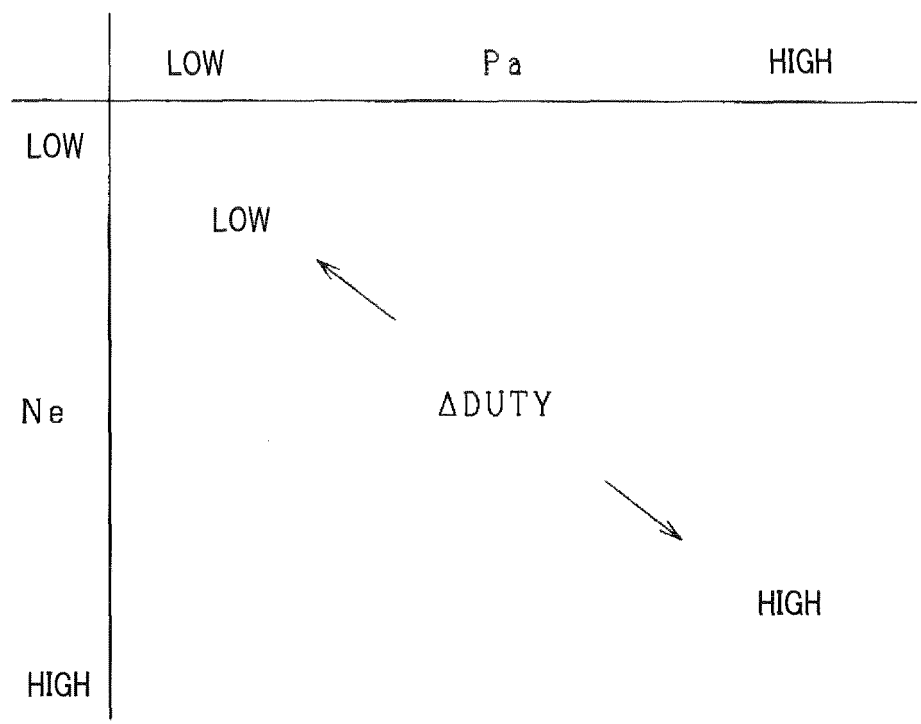
FIG. 3 is a map for explaining an operation of the ignition control apparatus shown in FIG. 2.

The second control signal IGb is produced based on the engine parameters, the energy input duration signal IGw, and the map shown in FIG. 3. Specifically, the driver circuit 319 generates the second control signal IGb based on the received engine parameters, the received energy input duration signal IGw, and the map shown in FIG. 3 and then outputs the second control signal IGb to the second control terminal 314G of the second switching device 314.

Figure 4:
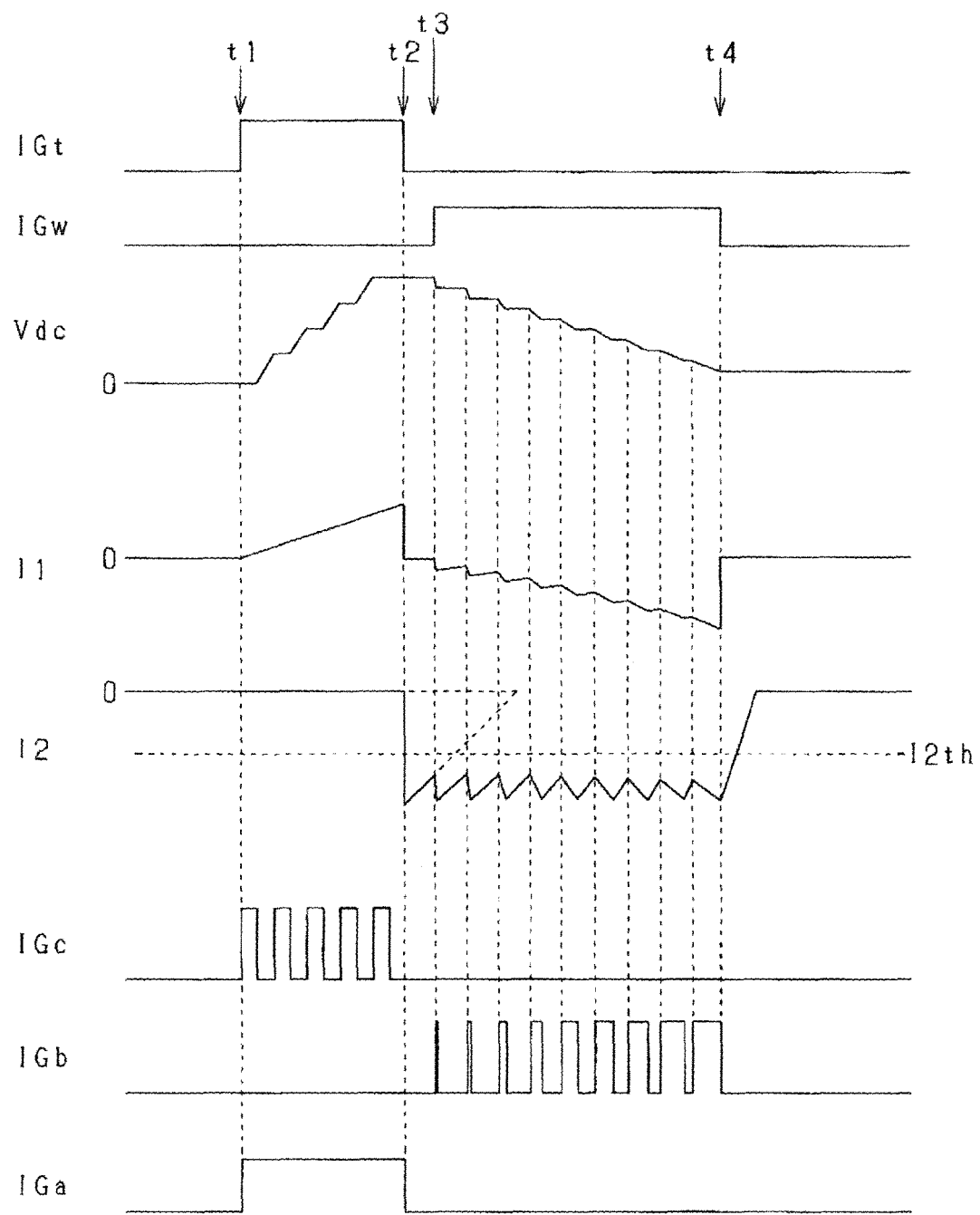
FIG. 4 is a time chart for explaining an operation of the ignition control apparatus shown in FIG. 2.

In this embodiment, as illustrated in FIG. 4, the second control signal IGb is a rectangular pulse signal which is outputted in constant cycles while the energy input duration signal IGw is at the high level. The second control signal IGb is produced to have a duty factor which increases with time between time t3 and time t4 at the increase rate ΔDUTY, as determined based on the engine parameter (i.e., the intake pressure Pa and the engine speed Ne) and the map of FIG. 3.

The third control signal IGc is produced based on the engine parameters and the energy input duration signal IGw. Specifically, the driver circuit 319 generates the third control signal IGc based on the received engine parameters and the received energy input duration signal IGw and then outputs the third control signal IGc to the third control terminal 315G of the third switching device 315. In this embodiment, the third control signal IGc is a rectangular pulse signal which is outputted in constant cycles while the energy input duration signal IGw is at the high level. The duty factor of the third control signal IGc is kept constant between time t1 and time t2 and determined based on the engine parameters.

The time-series operation of the structure in this embodiment will be described in detail with reference to FIG. 4. First, the electronic control unit 32 derives the engine parameters such as the accelerator manipulated variable ACCP, etc., when a given crank angle is reached in the cylinder 11b. The electronic control unit 32 determines the ignition timing in this combustion stroke in the cylinder 11b based on the engine parameters before the time t1 in FIG. 4, thereby producing the ignition signal IGt and the energy input duration signal IGw for this combustion stroke.

When the ignition signal IGt rises to the high level at time t1, it will cause the first control signal IGa to rise to the high level. This turns on the first switching device 313. In this time, the energy input duration signal IGw is at the low level, so that the second switching device 314 is kept off. The primary current then starts to flow through the primary winding 311a. This charges the ignition coil 311.

When the ignition signal IGt is at the high level, the third control signal IGc of a rectangular pulse shape is inputted to the third control terminal 315G of the third switching device 315. When the third switching device 315 is turned on, it will cause the energy to be stored in the energy storage coil 316. The energy is released from the energy storage coil 316 when the third switching device 315 is turned off and then stored in the capacitor 317. Specifically, the third switching device 315 is turned on or off in the above way to store the energy in the capacitor 317 through the energy storage coil 316, so that the voltage Vdc rises stepwise. Such storage of the energy in the capacitor 317 terminates by time t2.

Afterwards, when the first control signal IGa is changed from the high level to the low level at time t2, the first switching device 313 is turned off, thereby suddenly cutting the primary current now flowing through the primary winding 311a. This causes the ignition coil 311 to discharge, so that the discharge current that is a high secondary current is produced in the secondary winding 311b, thereby initiating the spark discharge from the spark plug 19.

In the conventional discharge control or in a running condition where the energy input duration signal IGw is kept low without being elevated to the high level after the start of spark discharge at time t2, the discharge current changes, as indicated by a broken line. The discharge current approaches zero as time proceeds and attenuates to a level at which it is impossible to maintain the discharge, so that the spark discharge terminates. The magnitude of discharge energy (i.e., energy inputted to the spark plug 19) in such a case corresponds to an inner area of a triangle, as indicated by a broken line in the time chart of the secondary current I2 of FIG. 4.

In this embodiment, at time t3 immediately after time t2, the energy input duration signal IGw is changed to the high level. This causes the second switching device 314 to be turned on (i.e., the second control signal IGb=H-level) when the third switching device 315 is in the off-state (i.e., the third control signal IGc=L-level), so that the energy stored in the capacitor 314 is released, and the above described input energy is supplied to the primary winding 311a through the low-voltage terminal of the primary winding 311a. This causes the primary current generated by the input energy to flow during the spark discharge (i.e., inductive discharge). In other words, an additional current which results from flow of the primary current created by the input energy is added to the discharge current flowing between time t2 and time t3.

The above described addition of the primary current to the discharge current is achieved each time the second switching device 314 is turned on between time t3 and time t4. Specifically, as demonstrated in FIG. 4, the primary current I1 is additionally created by the energy stored in the capacitor 317 each time the second control signal IGb rises, thereby causing the discharge current I2 to be additionally developed. The magnitude of the discharge current at this time corresponds to an area (i.e., integration) between time t2 to time t4 in the time chart of the secondary current I2 in FIG. 4. In other words, the above described input energy corresponds to the area between time t2 and time t4 minus the area of the triangle indicated by the broken line.

As described above, in this embodiment, the above described input energy keeps the discharge current or the spark discharge in a good condition. In the example, the interval between time t2 and time t3 is determined by the electronic control unit 32 using a map as a function of the engine speed Ne and the intake air quantity Ga to eliminate the probability of the blow-off of flame.

As is well known, the flame blow-off tends to occur depending upon the flow velocity of gas in the cylinder 11b or leaning of the air-fuel ratio in high-load or high-speed running conditions (e.g., the intake pressure Pa:high, the engine speed Ne: high, the throttle opening THA:great, the EGR rate:high, or the air-fuel ratio:lean). It is possible to control the storage of energy in the capacitor 317 between time t1 and time t2 where the ignition signal IGt is at the high level by the duty factor of the third control signal IGc. The greater the energy stored in the capacitor 317, the greater the input energy produced every time the second switching device 314 is turned on.

Figure 5:
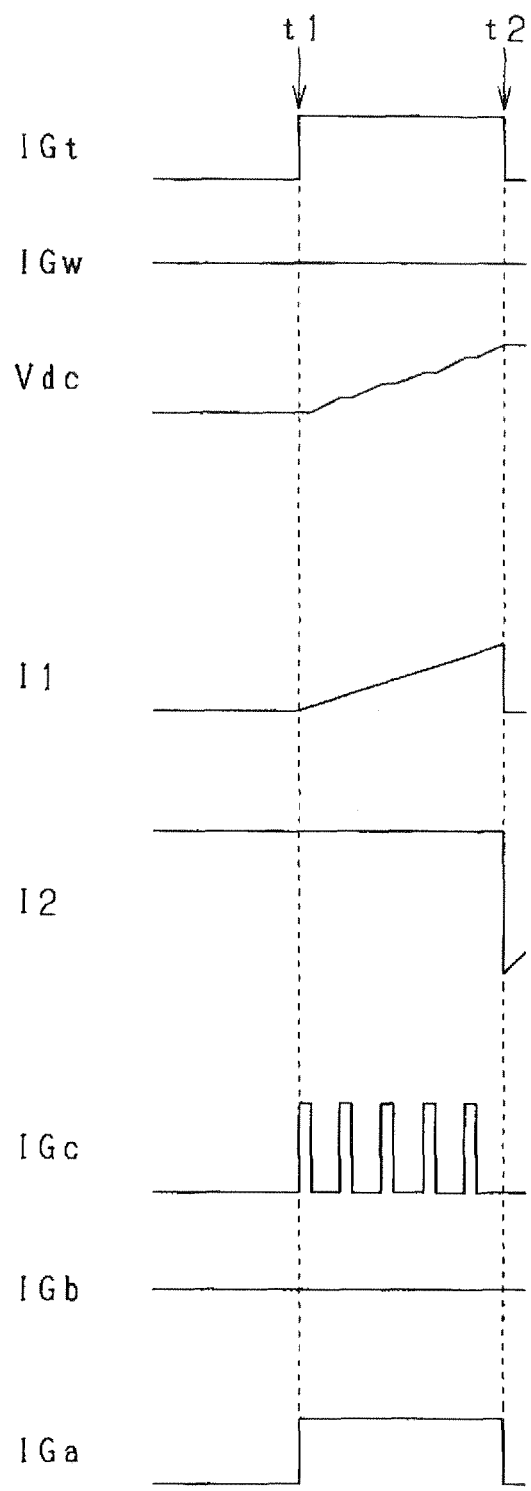
FIG. 5 is a time chart for explaining an operation of the ignition control apparatus shown in FIG. 2.

Accordingly, in this embodiment, the duty factor of the third control signal IGc is set greater as time proceeds from the start of ignition in the high-load or high-speed running conditions (e.g., intake pressure Pa:high, engine speed Ne:high, throttle opening THA:great, EGR rate:high, or air-fuel ratio:lean) where there is a high probability of flame blow-off occurring. This enables the amount of energy stored in the capacitor 317 or the amount of the input energy suitable for the running condition of the engine 11 to be properly determined, thereby controlling the blow-off of flame, saving electric power, and minimizing the wear of the electrodes of the spark plug 19 caused by unnecessary spark energy. FIG. 5 demonstrates a case where the duty factor of the third control signal IGc in a low-load or low-speed running condition where the flame blow-off hardly occurs is smaller than that in FIG. 4.

The state of flow of the discharge current during the spark discharge, as described above may be controlled by turning on or off the second switching device 317 to regulate the amount of energy released from the capacitor 317. In this embodiment, the duty factor of the second control signal IGb is, therefore, variably determined. Specifically, the second control signal IGb is produced to have the duty factor which changes at the increase rate ΔDUTY with time, that is, increases with an increase in engine load or engine speed. This, as demonstrated in FIG. 4, keeps the discharge current higher than or equal to a given level of I2th.

As described above, it is possible in this embodiment to control the state of flow of the discharge current properly depending upon the state of flow of gas in the cylinder 11b in order to avoid the flame blow-off. Therefore, the flame blow-off and a resulting loss of the ignition energy is controllable by a simple structure of the ignition control apparatus. In other words, it is possible to minimize an increase in size or manufacturing cost of the ignition control apparatus 30 (especially, the ignition control circuit 31) and to stabilize the state of combustion of the air-fuel mixture.

Particularly, the energy is inputted to the primary winding 311a from the low-voltage terminal thereof (i.e., from the first switching device 313), thus enabling the energy to be inputted at a lower voltage than that when the energy is inputted from the secondary winding 311b.

If the energy at a voltage higher than an output voltage from the dc power supply 312 is inputted to the primary winding 311a from the high-voltage terminal thereof, the efficiency will be degraded because of flow of current into the dc power supply 312. In contrast, the ignition control apparatus 30, as described above, works to input the energy to the primary winding 311a through the low-voltage terminal thereof, thereby providing beneficial effects that it is possible to easily efficiently input the energy to the primary winding 311a.

Modifications

Some modifications will be described below. In the following discussion, the same reference numbers as those in the above embodiment will refer to parts having the same structure of functions. The explanation of such parts will be given by the explanation made in the above embodiment unless they are technically consistent with each other. Of course, the modifications are not limited to those described below. A combination of a portion of the above embodiment and some or all possible modified forms of the above embodiment may be realized.

The present invention is not limited to the structure as described in the above embodiment. For instance, functional blocks of the electronic control unit 32 may partially be shared with the driver circuit 319. Alternatively, the driver circuit 319 may be divided for each of the switching devices. In the case where the first control signal IGa is the ignition signal IGt, the ignition signal IGt may be outputted directly from the electronic control unit 32 to the first control terminal 313G of the first switching device 313 without through the driver circuit 319.

The signal IGa needs not be identical with the signal IGc. For example, the driver circuit 319 may first produce and output only the signal IGc synchronously with the rising of the signal IGt and then output the signal IGa. In other words, the signal IGa may be outputted after the signal IGc. This results in an increase in quantity of energy stored in the capacitor 317. Alternatively, the signal IGc may be delayed until after the signal IGa is outputted.

The present invention is not limited to the structure as described in the above embodiment. For instance, the increase rate ΔDUTY may be determined based on either the intake pressure Pa or the engine speed Ne. The increase rate ΔDUTY may alternatively be determined based on a selected one or some of the engine parameters such as the intake pressure Pa, the engine speed Ne, the throttle opening THA, the EGR rate, the air-fuel ratio, the intake air quantity Ga, the accelerator manipulated variable ACCP.

The duty factor of the second control signal IGb may be kept constant for the one combustion cycle (i.e., time t3 to time t4). In this case, the duty factor is, like in the above embodiment, set as a function of the engine parameters using a DUTY map which is identical with the ΔDUTY map in FIG. 3.

The increase rate ΔDUTY may be used to decrease the duty factor of the second control signal IGb as well as increase it. Specifically, the duty factor of the second control signal IGb may be set to increase or decrease in one combustion cycle. This enables the pattern of the input energy suitable for the running conditions (i.e., for minimizing the possibility of the flame blow-off) to be realized.

Instead of the engine parameters, information available in producing the second control signal IGb or the third control signal IGc may be outputted from the electronic control unit 32 to the driver circuit 319.

In place of or in addition to the duty control of the third control signal IGc, as described in the above embodiment, the input energy may be changed by controlling the waveform of the energy input duration signal IGw (i.e., the time when the energy input duration signal IGw rises at time t3 in FIG. 3 and/or the interval between time t3 and time t4). In this case, the electronic control unit 32 works as a control portion instead of or in addition to the driver circuit 319.

The circuit structure for supplying the input energy to the primary winding 311a through the low-voltage terminal thereof (i.e., the circuit connected to the second power supply terminal 314D of the second switching device 314 is not limited to the one, as described in the above embodiment. For instance, such a structure may be made up of an isolated DC-DC converter, a forward converter, or a high-voltage battery which is usually mounted in hybrid vehicles.

The ignition control apparatus 407 in the second embodiment of the invention will be described below with reference to FIG. 6.

The ignition control apparatus 404 of this invention is provided for each of cylinders 11b of the internal combustion engine 11 of FIG. 1 and works to produce a spark to ignite the air-fuel mixture inducted into the combustion chamber.

The ignition control apparatus 407 is made up of the step-up circuit 401, the auxiliary power supply 402, the ignition switching device 403, the ignition coil 404, the spark plug 405, and the electronic control device 406 (which will also be referred to as ECU 406) disposed externally. The electronic control device 406 works as an engine control device.

The step-up circuit 401 is made up of the energy storage inductor 411 (which will also be referred to below as inductor 411) connected to the power supply 410, the step-up switching device 412 (which will be referred to below as switching device 412) which switches between supplying and cutting of electric current to the inductor 411 in a given cycle, the parallel-connected capacitor 415, the first rectifying device 414 which rectifies the current from the inductor 411 to the capacitor 415, and the primary winding 440 of the ignition coil 404. The step-up circuit 401 constitutes a so-called flyback step-up circuit.

The dc power supply 410 (which will be referred to below as power supply 410) uses a vehicle-mounted battery or a known dc stabilized power supply which converts ac power into the dc form using a regulator. The dc power supply 410 supplied a constant dc voltage of, for example, 12V or 24V.

In this embodiment, the step-up circuit 401 is exemplified as using the so-called flyback step-up circuit, but may alternatively be implemented by the so-called step-up chopper.

The inductor 411 is implemented by a coil with a core which has a given inductance Lo of 5 to 50 µH.

The switching device 412 is implemented by a thyristor or a power transistor such as IGBT (Insulated Gate Bipolar Transistor) or MOSFET (Metal Oxide Semiconductor Field Effect Transistor).

The switching device 412 is connected to a step-up device driver (which will be referred to below as driver 413).

To the driver 413, the engine control device 406 outputs the ignition signal IGt depending upon engine running conditions.

The driver 413 is responsive to the ignition signal IGt to produce a drive pulse which is changed between a high level and a low level at a given time in a given cycle for a given period of time.

The drive pulse is applied from the driver 413 to the gate G of the switching device 412 to turn on or off the switching device 412.

The capacitor 415 is implemented by a capacitor which has a given capacitance C of, for example, 100 to 100 µF.

The rectifying device 414 is implemented by a diode and works to block a backflow of current from the capacitor 415 to the inductor 411.

When the switching device 412 is opened or closed by the driver 413 in response to the ignition signal IGt outputted from the ECU 406, it will cause the electric energy, as stored in the inductor 411 from the power supply 410, to be added or charged into the capacitor 415, so that the charge/discharge voltage Vdc at the capacitor 415 is stepped up to a voltage (e.g., 50V to several hundreds V) higher than a power supply voltage.

The ignition coil 404 is made up of the primary winding 440 of N1 turns of wire, the secondary winding 441 of N2 turns of wire, the coil core 442, and the diode 443.

The primary voltage V1 which is stepped up by the step-up circuit 401 is applied to the primary winding 440 of the ignition coil 404 to increase or decrease the current flowing through the primary winding 440, so that the secondary voltage V2 that is a high voltage (e.g., −20 to −50 kV) depending upon a coil turn ratio N2/N1 is developed at the secondary winding 441.

The ignition switching device 403 (which will be referred to below as ignition device 403) is implemented by a power transistor PTr such as a MOS, a FET, or an IGBT.

The ignition device 403 is responsive to the ignition signal IGt, as outputted from the ECU 406 as a function of engine running conditions, to switch between supply and cutoff of the current to the primary winding 440.

When the current supply to the primary winding 440 is blocked by the switching operation of the ignition device 403, it results in a sudden change in magnetic field to create electromagnetic induction, so that the extremely high secondary voltage V2 is developed at the secondary winding 441 and then applied to the spark plug 405.

The auxiliary power supply 402 is made up of the auxiliary switching device 420 (which will be referred to below as auxiliary device 420) disposed between the capacitor 415 and the primary winding 440, the auxiliary device driver 421 (which will be referred to below as driver 421) which drives the auxiliary device 420, the second rectifying device 423, the power supply 410, the inductor 411, the capacitor 415, and the soft-off circuit 422 that is a major part of the invention.

The auxiliary power supply 402 works to additionally perform discharge from the step-up circuit 401 to a junction between the primary winding 440 of the ignition coil 404 and the ignition switching device 403 and then stop the discharge, thereby increasing the secondary current I2 flowing through the secondary winding 441.

The energy input from the auxiliary power supply 402 to the primary winding 440 is achieved at the low-voltage side.

The auxiliary device 420 is implemented by a quick-response power transistor such as a MOSFET.

The second rectifying device 423 is implemented by a diode which rectifies the current inputted from the capacitor 415 to the primary winding 440.

The driver 421 is joined to the auxiliary device 420 to open or close it.

The driver 421 is responsive to the discharge duration signal IGw, as outputted from the ECU 406, to produce the drive signal $V_{GS}$ which opens or closes the auxiliary device 420.

The drive signal $V_{GS}$ is a rectangular pulse signal which has a given duty factor to open or close the auxiliary device 420.

The discharge duration signal IGw is to instruct the auxiliary device 420 to open or close.

The auxiliary device 420 switches between the discharging of the capacitor 415 and stopping it to create flow of current in the primary winding 440 of the ignition coil 404, thereby increasing the current in and voltage at the secondary winding 441 to eliminate the flame blow-off.

At that time, the energy is inputted to the ignition coil 440 from the primary winding 440, thus enabling the energy to be applied thereto at a voltage which is lower than when the energy is inputted from the secondary winding 441.

The soft-off circuit 422 that is a main part of the invention works to block the conduction of the auxiliary device 420 slowly when the auxiliary device 420 is opened for avoiding a sudden change in the secondary current I2.

The soft-off circuit 422 is made by a capacitor whose capacitance C22 is, for example, 0.2 to 100 µF and which is disposed between a gate and a source of an n-channel MOSFET that is the auxiliary device 420.

With the above arrangements, when the auxiliary device 420 is opened or closed by the driver 421, it is used as a switch to set a turning off speed slower than a turning on speed of the MOSFET.

When the auxiliary device 420 is opened or closed quickly, it will cause the energy to be supplied to the spark plug 405 intermittently. The ignition control apparatus 407, however, works to discharge the capacitor 422 to slow the falling of the drive voltage $V_{GS}$ supplied from the driver 421, thereby achieving continuous supply of the energy from the auxiliary power supply 402 to the ignition coil 404. This minimizes a sudden change in the secondary current, avoids blow-off of the secondary current, and achieves the stable ignition.

Figure 7A:
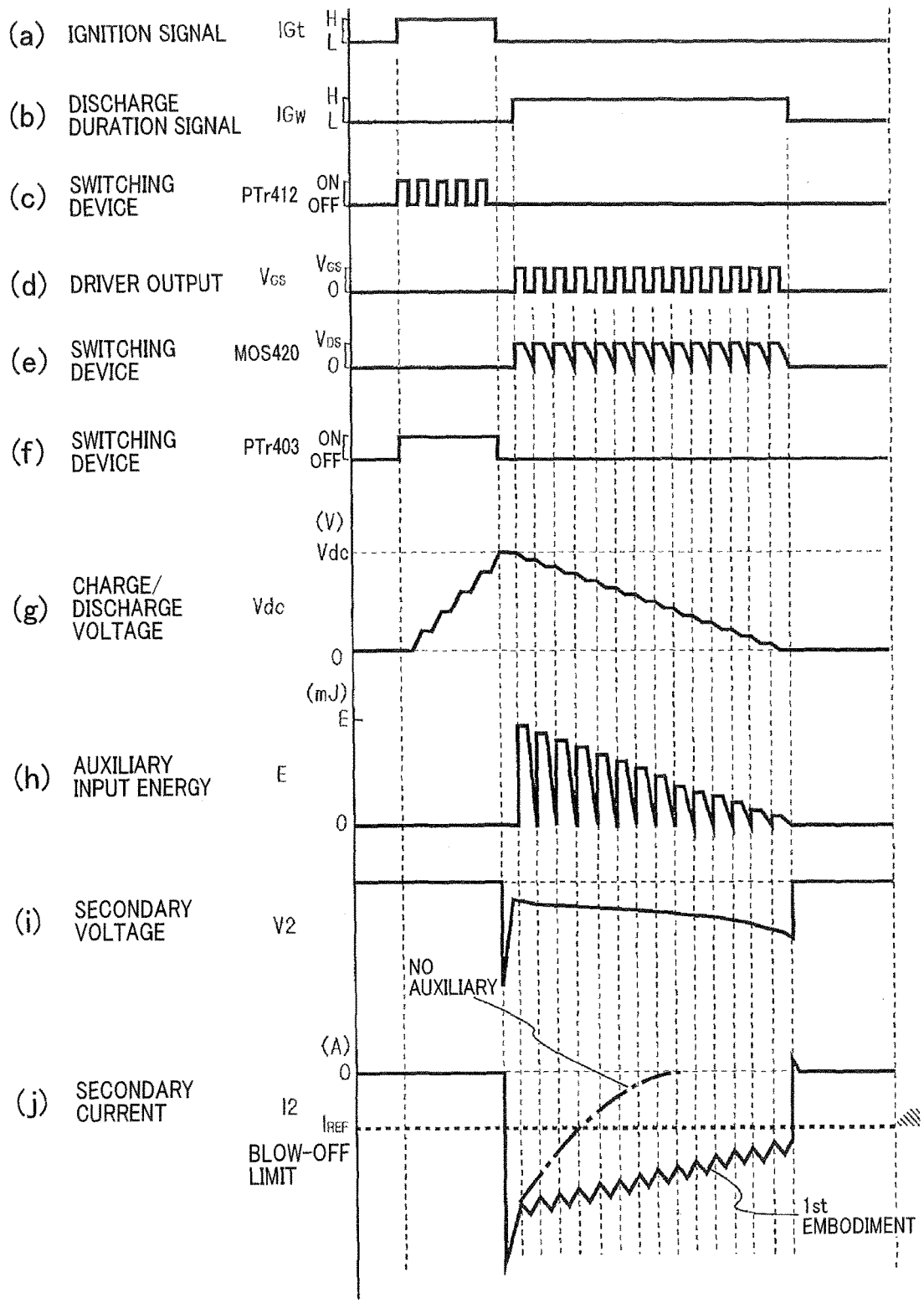
FIG. 7A is a time chart for explaining an operation of an ignition control apparatus of the second embodiment.

The operation of the ignition control apparatus 407 will be described below with reference to FIGS. 7A and 7B.

The ECU 406, as demonstrated in (a), outputs the ignition signal IGt. The switching device 412, as illustrated in (c), starts to be on or off in synchronism with the rising of the ignition signal IGt. Simultaneously, the switching device 403 is, as illustrated in (f), turned on.

The turning on or off of the switching device 412 causes the electric energy to be charged from the inductor 411 into the capacitor 415, so that the discharge voltage Vdc, as illustrated in (g), rises gradually.

Driving of the switching device 412 is stopped synchronously with the falling of the ignition signal IGt. When the switching device 402 is closed simultaneously, it will cause, as illustrated in (i), the high secondary voltage V2 to be developed at the secondary side of the ignition coil 404 and applied to the spark plug, thereby starting the discharge. The secondary current I2, as illustrated in (j), then continues to flow for a given period of time.

In the conventional spark ignition control apparatus, the secondary current I2, as indicated by a broken line as a comparative example in (j), which corresponds to the energy stored in the ignition coil 404 continues to flow.

However, in this invention, the drive voltage $V_{GS}$ which switches, as illustrated in (d), between the high and low levels at a given duty factor is developed between the gate and the source of the auxiliary device 420, as illustrated in (b), synchronously with the rising of the discharge duration signal IGw.

The soft-off circuit that is a main part of the invention is implemented by the soft-off capacitor 422 (which will be referred to below as capacitor 422) disposed between the gate and the source of the auxiliary device 420. The turning off period of time of the auxiliary device 420 is, therefore, as illustrated in (e), longer than the turning on period of time thereof.

Therefore, the switching operation of the auxiliary device 420 causes, as shown in (g), the capacitor 425 to be discharged and then stopped from discharging cyclically, thus resulting in a change in current flowing through the primary winding 440 of the ignition coil 404, so that the discharged energy is, as illustrated in (h), supplied from the secondary winding 414 to the spark plug 405.

Figure 7B:
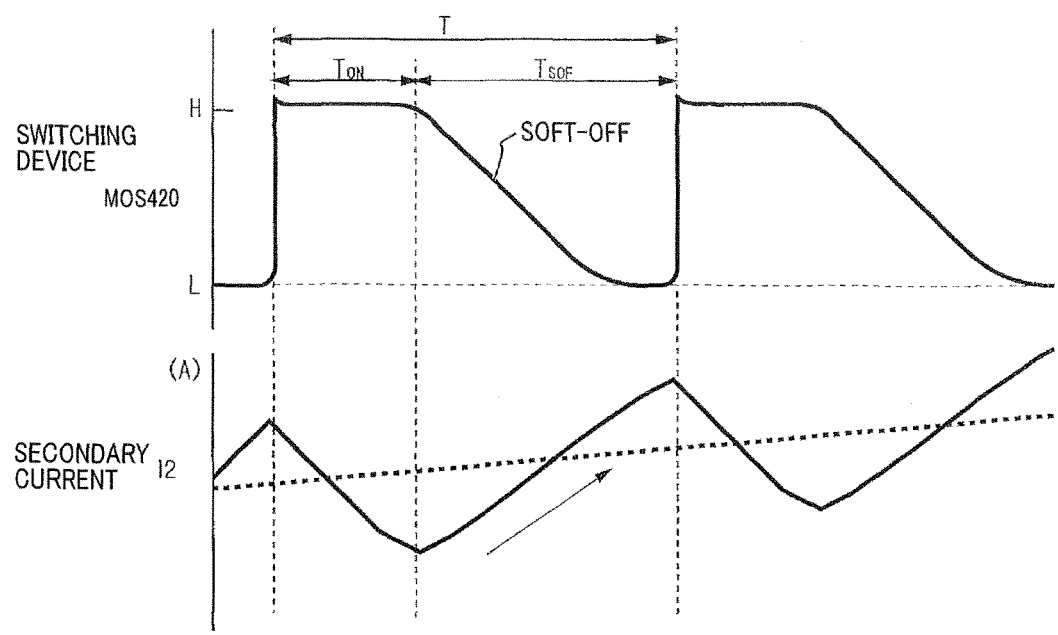
FIG. 7B is an enlarged view of a major portion of FIG. 7A.

The input of and the stop of the input of the discharged energy to the spark plug 405 is achieved slowly, as demonstrated in FIG. 7B, by the soft-off operation of the auxiliary device 420 without letting the secondary current I2 change normally. This results in a slow change in the secondary current I2.

Accordingly, the secondary current I2 is kept above the discharge blow-off limit current $I_{REF}$ until the discharge duration signal IGw falls, thereby maintaining the discharge and enabling the energy input.

A problem caused by a case where the soft-off circuit 422 that is the main part of the invention is not used will be described as the comparative example No. 1 with reference to FIGS. 8A and 8B.

Figure 6:
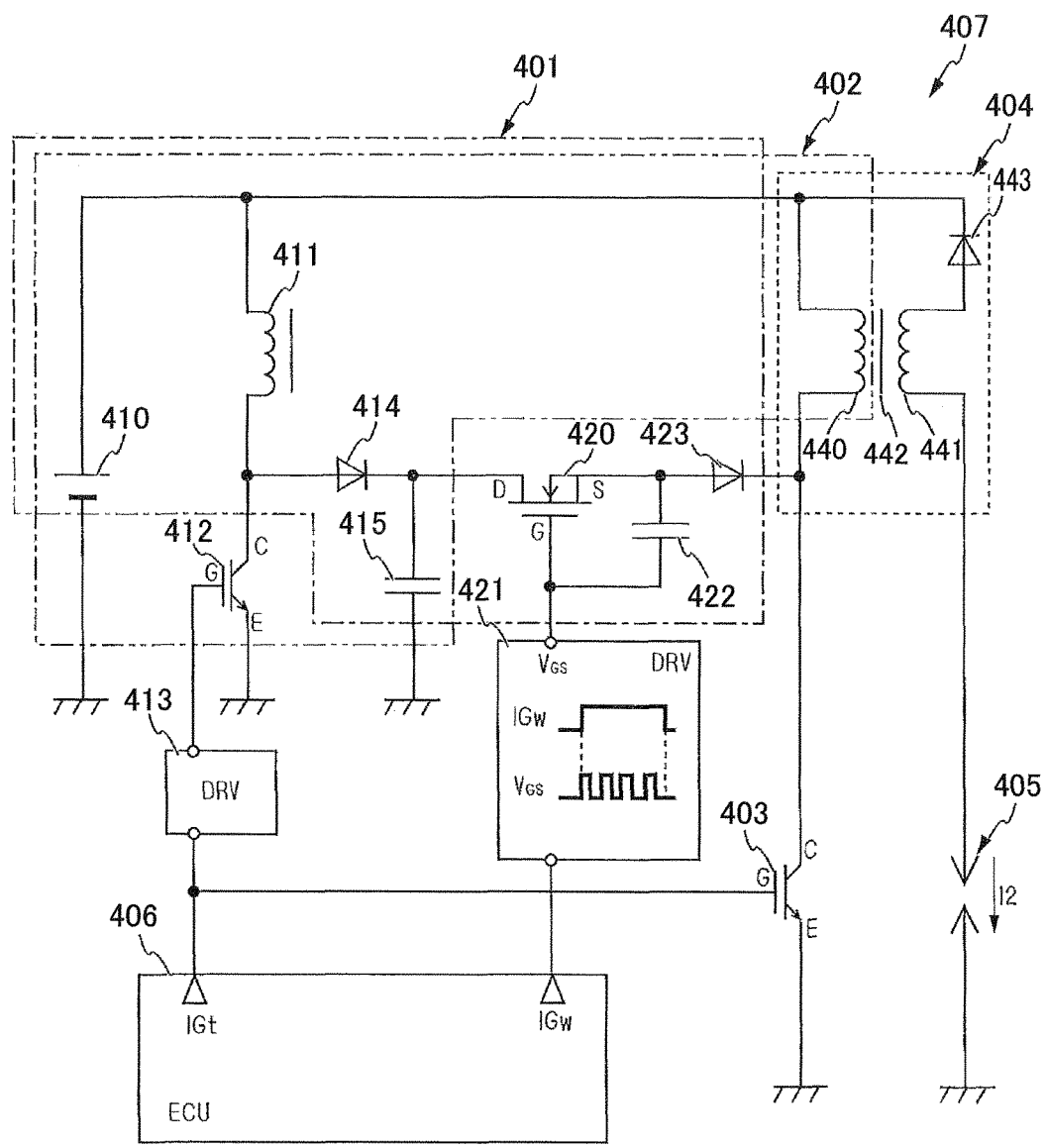
FIG. 6 is a schematic structural view of an ignition control apparatus in the second embodiment of the invention.

The comparative example No. 1 is identical in structure with the second embodiment of FIG. 6 except for the soft-off circuit 422.

Figure 8A:
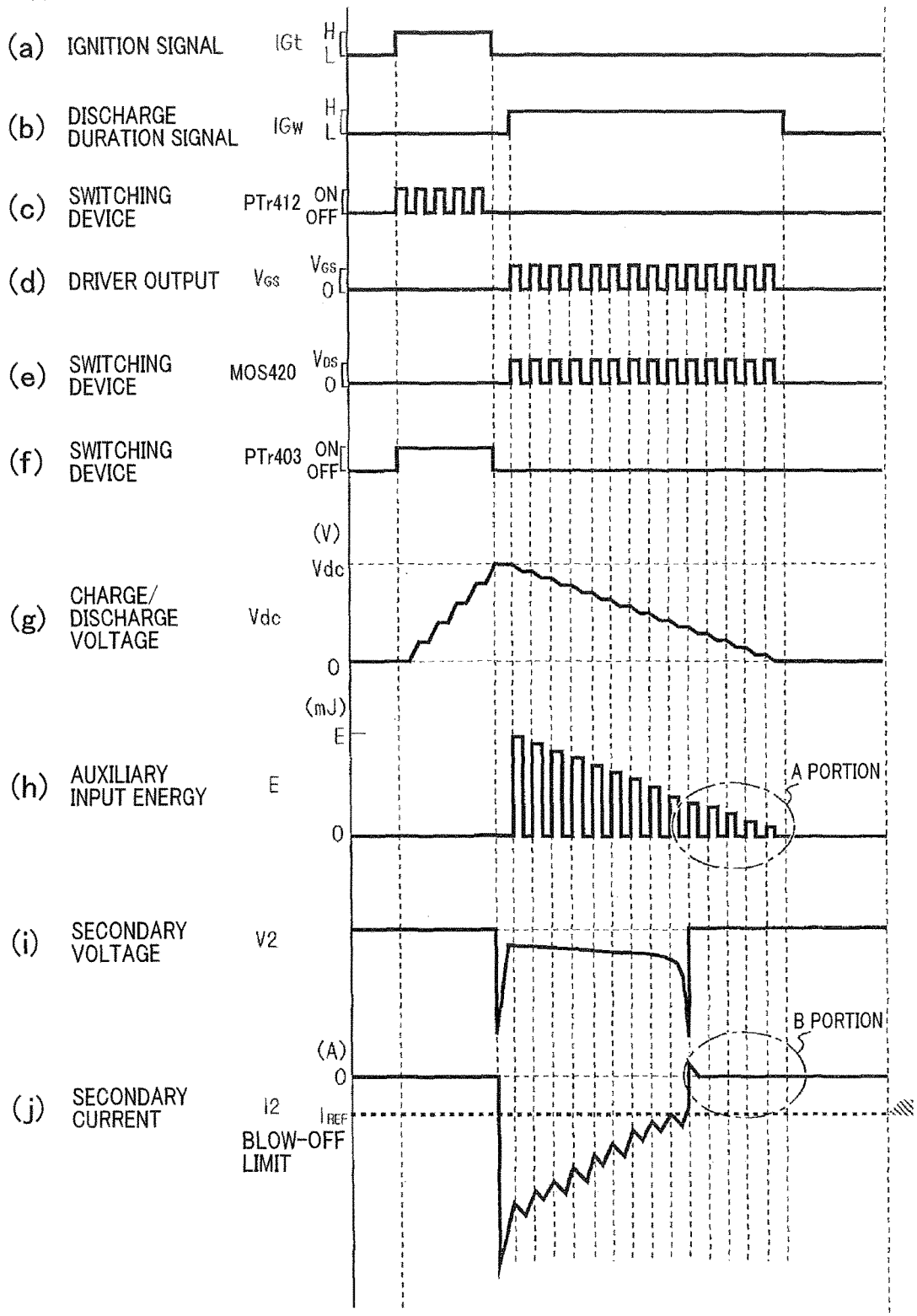
FIG. 8A is a time chart which represents an operation of an ignition control apparatus designed not to use a soft-off means that is a main part of the invention which is illustrated as a comparative example No. 1.

In the comparative example No. 1 shown in in FIG. 8A, when the auxiliary device 420 is, as demonstrated in FIGS. 8A(d) and 8A(e), opened or closed by the drive pulse outputted from the driver 413, it will cause the capacitor 415 to be discharged or stopped from being discharged cyclically, so that the discharged energy is, as illustrated in FIG. 8A(h), inputted.

Figure 8B:
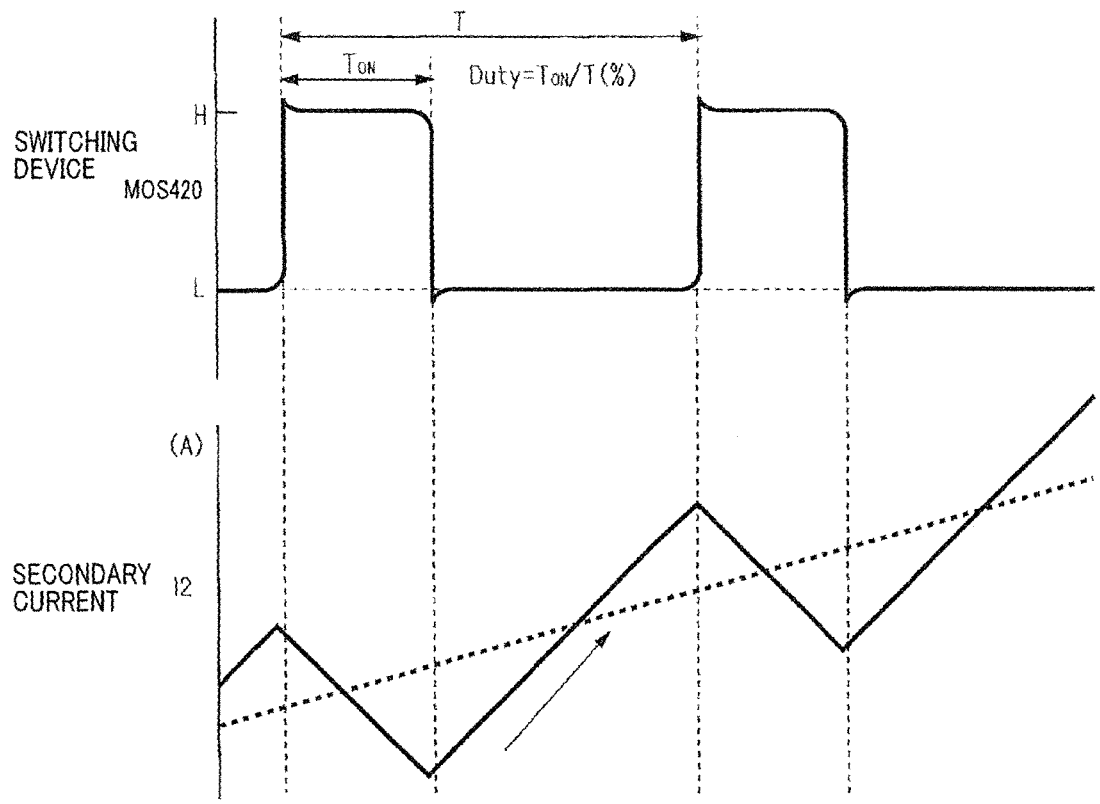
FIG. 8B is an enlarged view of a major portion of FIG. 8A.

However, the secondary current I2, as illustrated in FIG. 8B, increases automatically after the stop of input of the discharged energy, so that the rate of decrease in secondary current I2 resulting from the stop of input of the discharged energy is greater than the rate of increase in secondary current I2 resulting from the input of the discharge keeping energy.

We have found that in the comparative example No. 1, the capacitor 415 is, as indicated by a portion A in FIG. 8A(h), discharged cyclically, but the secondary current I2, as clearly demonstrated in FIG. 8(j), drops below the discharge blow-off limit current $I_{REF}$ to allow discharge blow off, so that the energy is not inputted and is wasted.

This may lead to a difficulty in maintaining the discharge desirably, resulting in instability in igniting the mixture when a strong gas flow is occurring in the combustion chamber or in a condition where the ignitability of the mixture is low in a very lean-burn mode.

The ignition control apparatus 407a of the third embodiment of the invention will be described below with reference to FIGS. 9A and 9B.

Figure 9A:
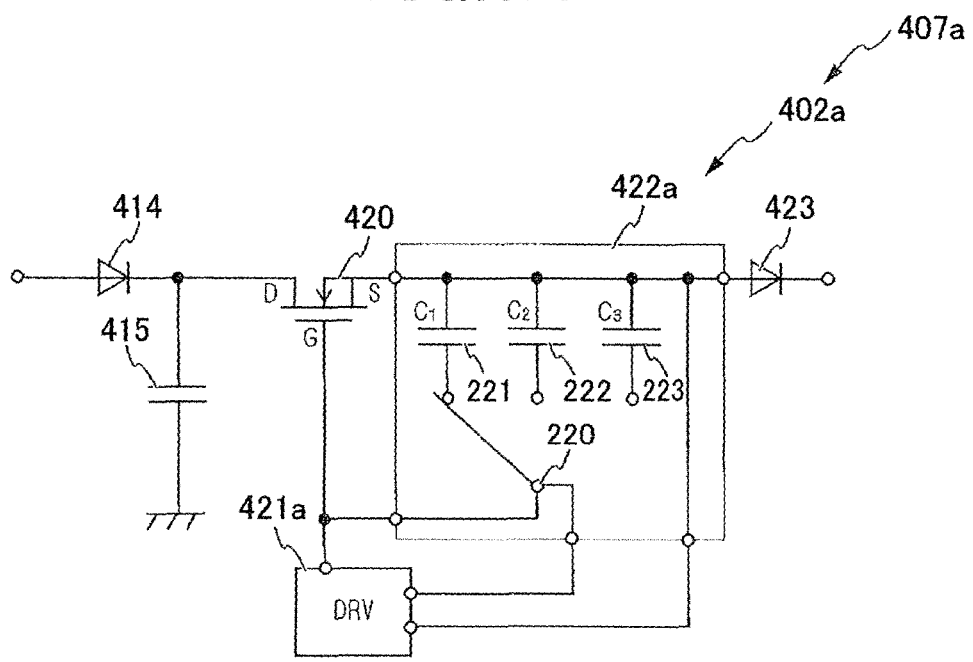
FIG. 9A is a schematic structural view of an ignition control apparatus in the third embodiment of the invention.

The ignition control apparatus 407a basically has the same structure as that in the second embodiment except that the soft-off circuit 422a, as illustrated in FIG. 9A, includes a plurality of capacitors 221, 222, and 223 whose capacitances are different from each other and the switching mechanism 220 which works to select one of the capacitors 221, 222, and 223 which is to be used according to running conditions of the internal combustion engine, and that the driver 421a performs a switching operation on the switching mechanism 220 as well as drives the auxiliary device 420.

Figure 9B:
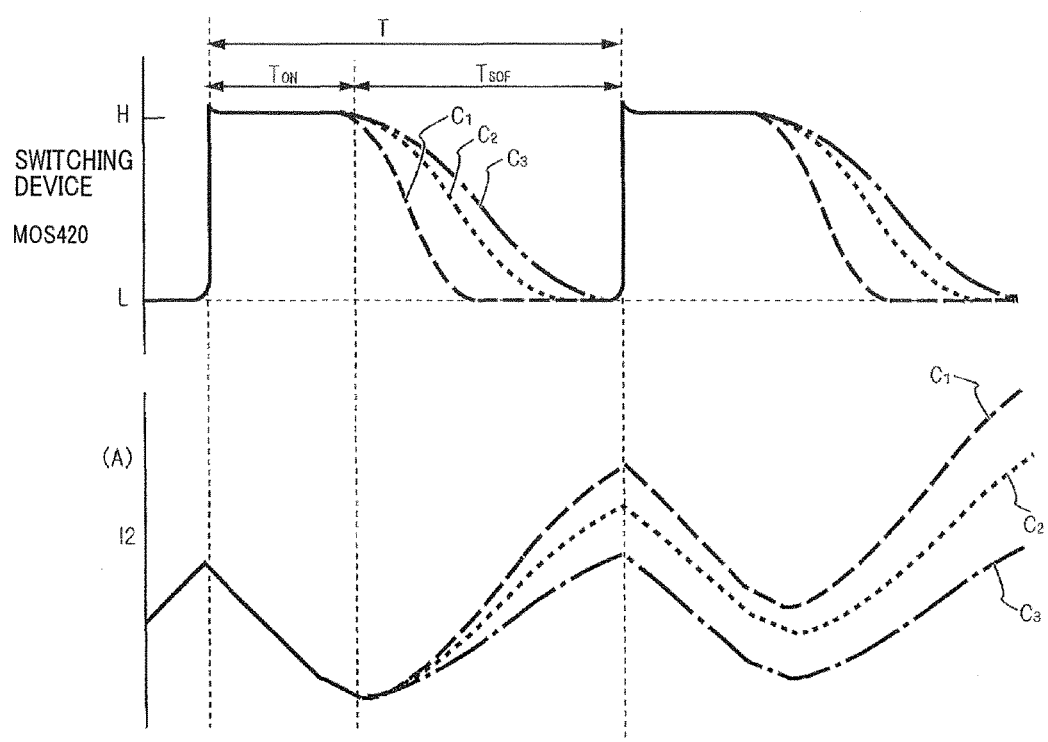
FIG. 9B is a time chart which represents an operation of an ignition control apparatus of the third embodiment of the invention.

The switch among the capacitors 221, 222, and 223, as illustrated in FIG. 9B, results in switching among the electrostatic capacitances C2, and C3 which are connected in parallel between the gate and the source, which leads to a change in turning off period of time of the auxiliary device 420 to further slow the soft-off operation, so that the secondary current I2 changes slowly.

The ignition control apparatus 407a may be designed to constitute an ON/OFF circuit which works to switch among the soft-off capacitors 221, 222, and 223 in sequence when the discharge duration signal IGw is on or when the auxiliary device 420 is in the on-state in order not to have the capacitors 221, 222, and 223 open when they are switched.

The ignition control apparatus 407a is equipped with the three capacitors 221, 222, and 223, but the number of them is not limited thereto and may be changed depending upon the internal combustion engine.

It is advisable that capacitances of the capacitors disposed between the gate and the source of the auxiliary device 420 be increased with an increase in change in secondary current I2.

Figure 10A:
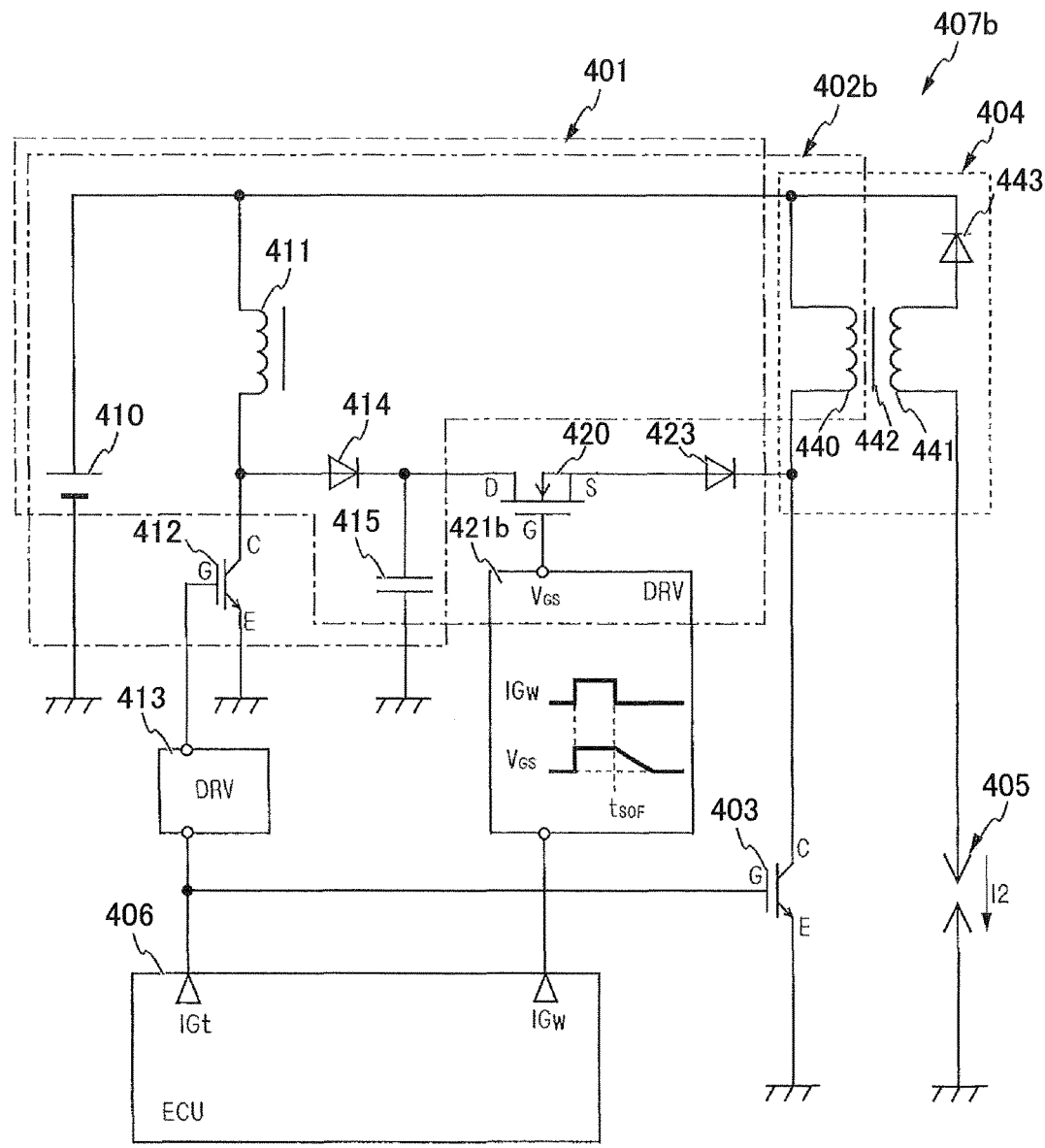
FIG. 10A is a schematic structural view of an ignition control apparatus in the fourth embodiment of the invention.

The ignition control apparatus 407b of the fourth embodiment of the invention will be described with reference to FIGS. 10A and 10B.

In the above embodiments, the soft-off circuits 422 and 422a are designed to have capacitances joined in parallel between the gate and the source of the auxiliary device 420 to turn off the auxiliary device 420 slowly for preventing the discharge of the secondary current I2 from terminating suddenly when the drive signal $V_{GS}$ outputted in the form of a rectangular pulse signal from the drivers 421 and 421a falls in level, but however, the ignition control apparatus 407b of the fourth embodiment is engineered to control the drive signal $V_{GS}$ outputted from the driver 421b to perform the soft-off operation on the auxiliary device 420.

In the above embodiment, the drive signal $V_{GS}$ is outputted from the driver 421 in the form of a rectangular pulse signal which opens and closes the auxiliary device 420 cyclically at a plurality of times when the discharge duration signal IGw is kept at the high level, while the ignition control apparatus 407b is engineered to have the driver 421b which serves to produce the drive signal $V_{GS}$ only once in synchronism with the rising of the discharge duration signal IGw and then decrease the drive signal $V_{GS}$ gradually in synchronism with the falling of the discharge duration signal IGw.

The ignition control apparatus 407b, like in the above embodiments, may be designed to open and close the auxiliary device 420 cyclically at a plurality of times. However, in this case, the discharge duration signal IGw is identical in time length with that in the above embodiments.

The beneficial effects in this embodiment will be described below along with differences between themselves and those in the comparative Example No. 2. FIG. 10B illustrates the case of use of the ignition control apparatus 407b as the fourth embodiment indicated by solid lines and also shows the comparative example No. 2 using chain lines.

Figure 10B:
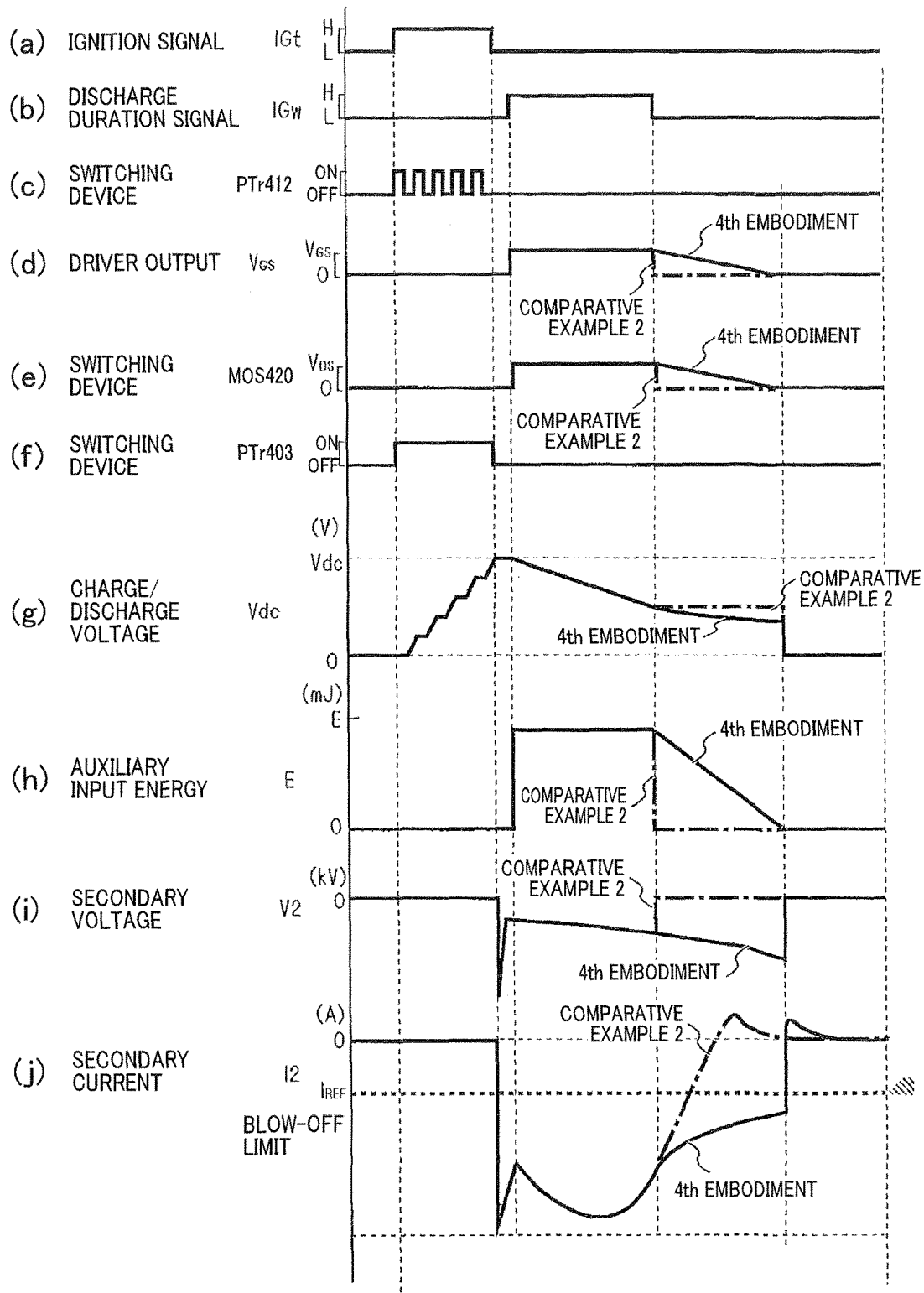
FIG. 10B is a time chart which represents an operation of the ignition control apparatus of FIG. 10A along with a comparative example No. 2.

In the fourth embodiment, the output $V_{GS}$ Of the driver 421b is, as indicated by the solid line in FIG. 10B(d), controlled to fall slowly synchronously with the falling of the discharge duration signal IGw.

This control may be achieved by an analog circuit which has a soft-off capacitor disposed in the driver 421b or by an arithmetic circuit in a digital form within the driver 421b.

In the comparative example No. 2, the soft-off circuit that is the main part of this invention is not provided. The output of the driver is, as illustrated in FIG. 10B(d), elevated sharply. Simultaneously, the auxiliary device 420 is, as illustrated in FIG. 10B(e), elevated sharply.

We, therefore, have found that the secondary current I2 produced by the discharge from the auxiliary device 420, as illustrated in FIG. 10B(i), is the same between the fourth embodiment and the comparative example No. 2 when the auxiliary device 420 is in the on-state, however, the auxiliary device 420 is turned off slowly in the fourth embodiment, while it is turned off rapidly in the comparative example No. 2, so that the rate at which the secondary current I2 increases in the fourth embodiment is smaller than that in the comparative example No. 2, thereby increasing the discharge duration in the fourth embodiment.

Like in the above embodiments, the ignition control apparatus 407b is, therefore, capable of keeping the energy discharged for an increased period of time with economy and ensuring the stability in igniting the mixture.

The ignition control apparatus 407b, like in the above embodiments, may use a soft-off capacitor(s), be designed to softly turn off the output of the driver 421b using a program or have the soft-off capacitor(s) installed in the driver 421b to achieve the soft-off operation in analog form.

The ignition control apparatus 407 of the fifth embodiment of the invention will be described below with reference to FIG. 11.

The ignition control apparatus 407 of this invention is provided for each of cylinders 11b of the internal combustion engine 11 of FIG. 1 and works to produce a spark to ignite the air-fuel ratio inducted into the combustion chamber.

The ignition control apparatus 407 is made up of the step-up circuit 401, the auxiliary power supply 402, the ignition switching device 403, the ignition coil 404, the spark plug 405, and the electronic control device 406 (which will also be referred to as ECU 406) disposed externally.

The step-up circuit 401 is made up of the energy storage inductor 411 (which will also be referred to below as inductor 411) connected to the power supply 410, the step-up switching device 412 (which will be referred to below as step-up switching device 412) which switches between supplying and cutting of electric current to the inductor 411 in a given cycle, the capacitor 415 connected in parallel to the inductor 411, the first rectifying device 414 which rectifies the current from the inductor 411 to the capacitor 415, and the primary winding 440 of the ignition coil 404. The step-up circuit 401 constitutes a so-called flyback step-up circuit.

The dc power supply 410 (which will be referred to below as power supply 410) uses a vehicle-mounted battery or a known dc stabilized power supply which converts ac power into the dc form using a regulator. The dc power supply 410 supplied a constant dc voltage of, for example, 12V or 24V.

In this embodiment, the step-up circuit 401 is exemplified as using the so-called flyback step-up circuit, but may alternatively be implemented by the so-called step-up chopper.

The inductor 411 is implemented by a coil with a core which has a given inductance Lo of 5 to 50 μH.

The step-up switching device 412 is implemented by a thyristor or a power transistor such as IGBT (Insulated Gate Bipolar Transistor) or MOSFET (Metal Oxide Semiconductor Field Effect Transistor).

The step-up switching device 412 is connected to a step-up device driver (which will be referred to below as driver 413).

To the driver 413, the engine control device 406 (which will be referred to below as ECU 406) outputs the ignition signal IGt depending upon engine running conditions.

The driver 413 is responsive to the ignition signal IGt to produce a drive pulse which is changed between a high level and a low level at a given time in a given cycle for a given period of time.

The drive pulse $V_{GS}$ is applied from the driver 413 to the gate G of the step-up switching device 412 to turn on or off the step-up switching device 412.

The capacitor 415 is implemented by a capacitor which has a given capacitance C of, for example, 100 to 1000 μF and is engineered to store electric charge great enough to produce a maximum input energy.

The rectifying device 414 is implemented by a diode and works to block a backflow of current from the capacitor 415 to the inductor 411.

When the switching device 412 is opened or closed by the driver 413 in response to the ignition signal IGt outputted from the ECU 406, it will cause the electric energy, as stored in the inductor 411 from the power supply 410, to be added or charged into the capacitor 415, so that the charge/discharge voltage Vdc at the capacitor 415 is stepped up to a voltage (e.g., 50V to several hundreds V) higher than a power supply voltage.

The ignition coil 404 is made up of the primary winding 440 of N1 turns of wire, the secondary winding 441 of N2 turns of wire, the coil core 442, and the diode 443.

The voltage at the power supply 410 is applied to the primary winding 440 of the ignition coil 404 to increase or decrease the current flowing through the primary winding 440, so that the secondary voltage V2 that is a high voltage (e.g., −20 to −50 kV) depending upon a coil turn ratio N2/N1 is developed at the secondary winding 441.

The ignition switching device 403 (which will be referred to below as ignition device 403) is implemented by a power transistor PTr such as a MOS, an FET, or an IGBT.

The ignition device 403 is responsive to the ignition signal IGt, as outputted from the ECU 406 as a function of engine running conditions, to selectively supply and cut the current to the primary winding 440.

When the current supply to the primary winding 440 is blocked by the switching operation of the ignition device 403, it results in a sudden change in magnetic field to create electromagnetic induction, so that the extremely high secondary voltage V2 is developed at the secondary winding 441 and then applied to the spark plug 405.

The auxiliary power supply 402 is made up of the auxiliary switching device 420 (which will be referred to below as auxiliary device 420) disposed between the capacitor 415 and the primary winding 440, the auxiliary device driver 421 (which will be referred to below as driver 421) which drives the auxiliary device 420, the second rectifying device 422, the power supply 410, the inductor 411, and the capacitor 415.

The auxiliary power supply 402 works to additionally perform discharge from the step-up circuit 401 to a junction between the primary winding 440 of the ignition coil 404 and the ignition switching device 403 and then stop the discharge, thereby increasing the secondary current I2 flowing through the secondary winding 441.

The auxiliary device 420 is implemented by a quick-response power transistor such as a MOSFET.

The second rectifying device 423 is implemented by a diode which rectifies the current inputted from the capacitor 415 to the primary winding 440.

The driver 421 is connected to the auxiliary device 420 to open or close it.

The driver 421 is responsive to the discharge duration signal IGw, as outputted from the ECU 406, to produce the drive pulse signal $V_{GS}$ which opens or closes the auxiliary device 420.

The driver 421 that is a main part of the invention has the frequency calculating portion 210 installed therein.

The frequency calculating portion 210 increases or decreases the drive pulse frequency of the drive pulse signal $V_{GS}$ as a function of the engine parameter EPr inputted directly or indirectly externally.

Specifically, a reference frequency is predetermined by a map and set to a drive frequency in a given increasing and decreasing way as a function of the running condition of the engine.

Figure 13A:
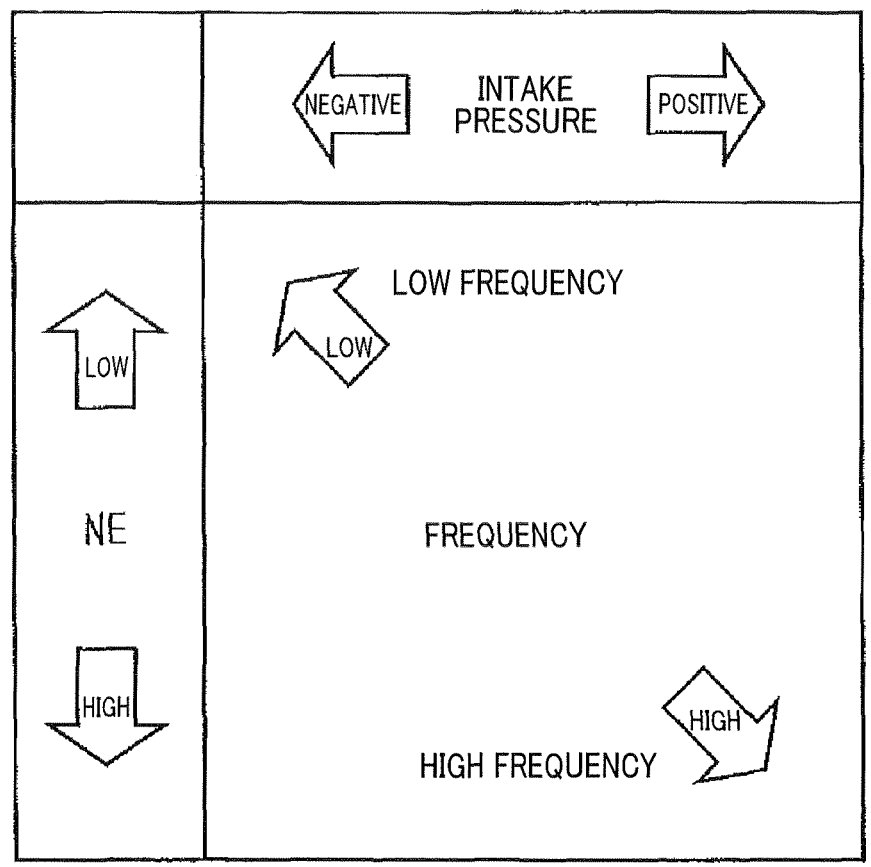
FIG. 13A is an example of a map which represents a relation between engine parameters and a frequency.
Figure 13B:
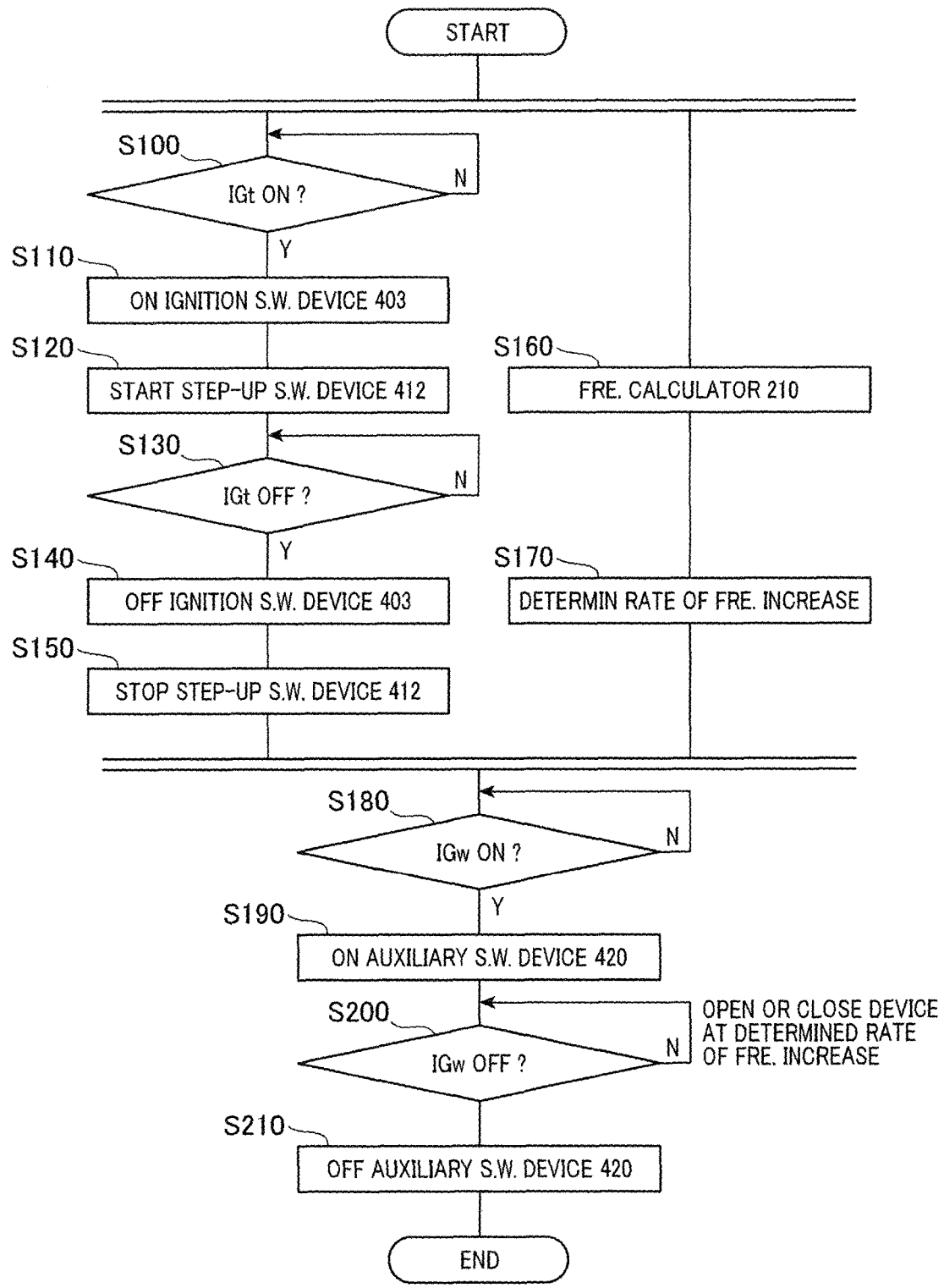
FIG. 13B is a flowchart which represents an example of how to calculate frequency for use in an ignition control apparatus of the invention.

An example of a flowchart for use in calculating the frequency is illustrated in FIG. 13B.

Figure 13C:
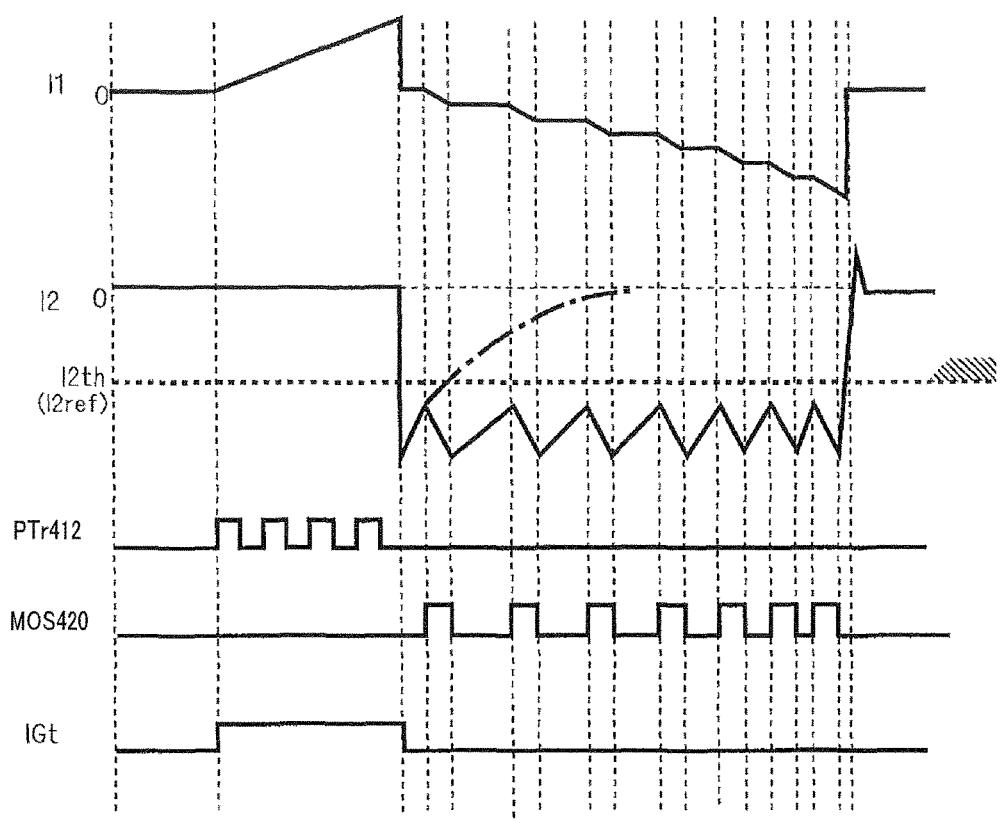
FIG. 13C is a time chart which represents an example of how to switch drive pulse frequencies.
Figure 13D:
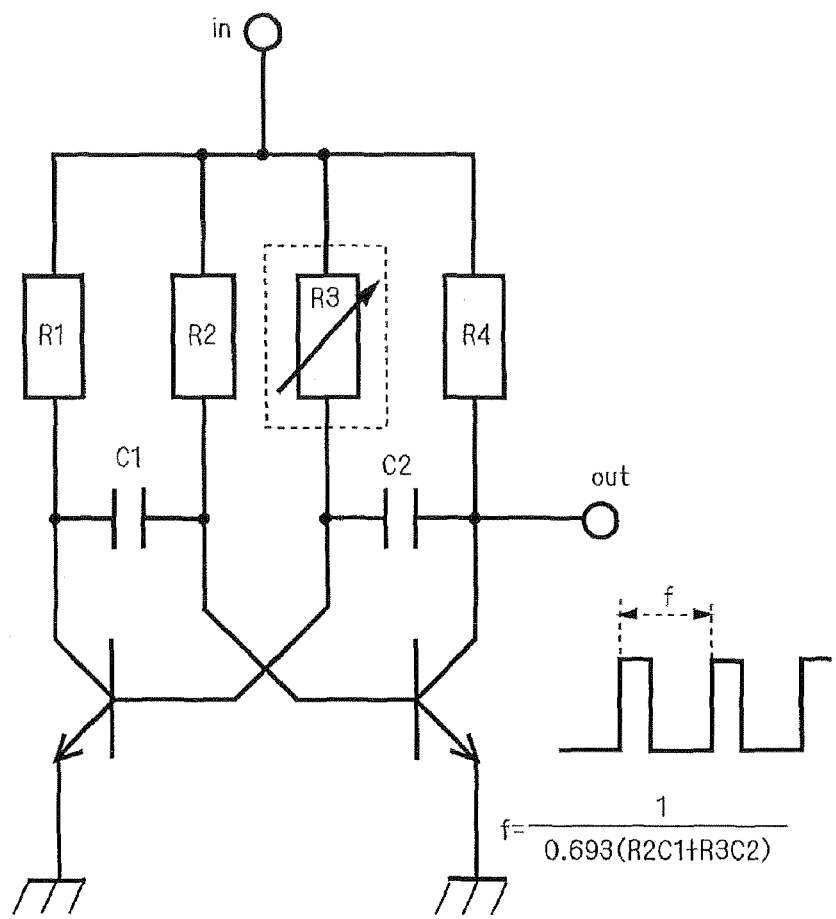
FIG. 13D is a circuit diagram which represents an example of a frequency calculating portion.
Figure 13D:
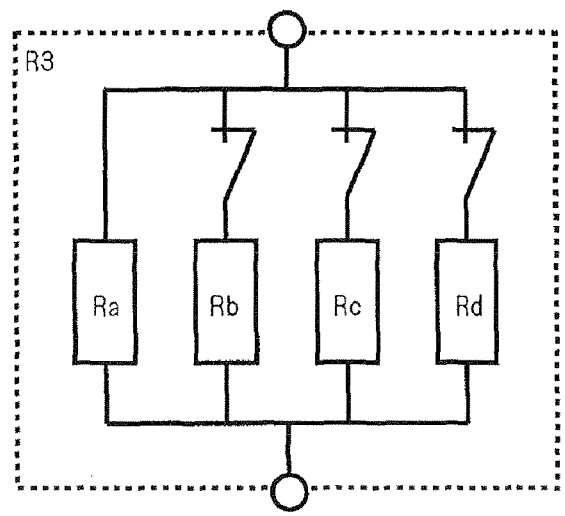

The structure of the frequency calculating portion 210 may be realized by a digital circuit, for example, implemented by programming an IC or by an analog circuit, for example, an astable multivibrator illustrated in FIG. 13D.

The engine parameter EPr is one or some of, for example, the engine speed Ne, the intake pressure PIN, the accelerator position Th, the crank angle CA, the engine coolant temperature Tw, the EGR rate, and the air-fuel ratio A/F.

The running condition of the internal combustion engine 11 is derived from the engine parameter EPr to determine whether the drive frequency should be increased or decreased using a map, as described later.

The engine parameter EPr detected by a running condition determining means not shown such as an engine speed sensor, an intake pressure sensor, an accelerator position sensor, a crank angle sensor, an engine coolant temperature sensor, an EGR sensor, and an A/F sensor installed externally is transmitted indirectly to the frequency calculating portion 210 through the ECU 406, but may be inputted directly to the frequency calculating portion 210.

The drive pulse signal $V_{GS}$ is a rectangular pulse signal which has a given duty factor to open or close the auxiliary device 420. The frequency of the drive pulse signal $V_{GS}$ is increased or decreased as a function of a running condition of the internal combustion engine 11, as determined by the engine parameter EPr.

The ECU 406 also outputs the discharge duration signal IGw to the driver 421.

The discharge duration signal IGw is to instruct the auxiliary device 420 to open or close and stop.

The auxiliary device 420 switches between the discharging of the capacitor 415 and stopping it to create flow of current in the primary winding 440 of the ignition coil 404, thereby increasing the current in and voltage at the secondary winding 441 to eliminate the flame blow-off. The input of the energy to the ignition coil 404 from the primary winding 440 enables the energy to be inputted at a lower voltage than when the energy is inputted from the secondary winding 441.

The rate of increase in frequency for opening or closing the auxiliary device 420 is set to be higher in a running condition such as high speed or high load which causes a high probability of misfire.

The energy is outputted from the auxiliary power supply 402 in a short cycle before the secondary winding I2 drops below the blow-off limit current $I_{REF}$ and disappears, thus ensuring the stability of ignition of the mixture.

The rate of increase in frequency for opening or closing the auxiliary device 420 is set to be lower in a condition such as low speed or low load which facilitates the ease of ignition of the mixture, thereby controlling the input of energy to decrease in consumption of electric power.

The operation of the ignition control apparatus 407 of this invention will be described below with reference to FIGS. 12A and 12B. A problem caused by a case where the frequency calculating portion 210 that is the main part of the invention is not used will also be discussed.

Figure 12A:
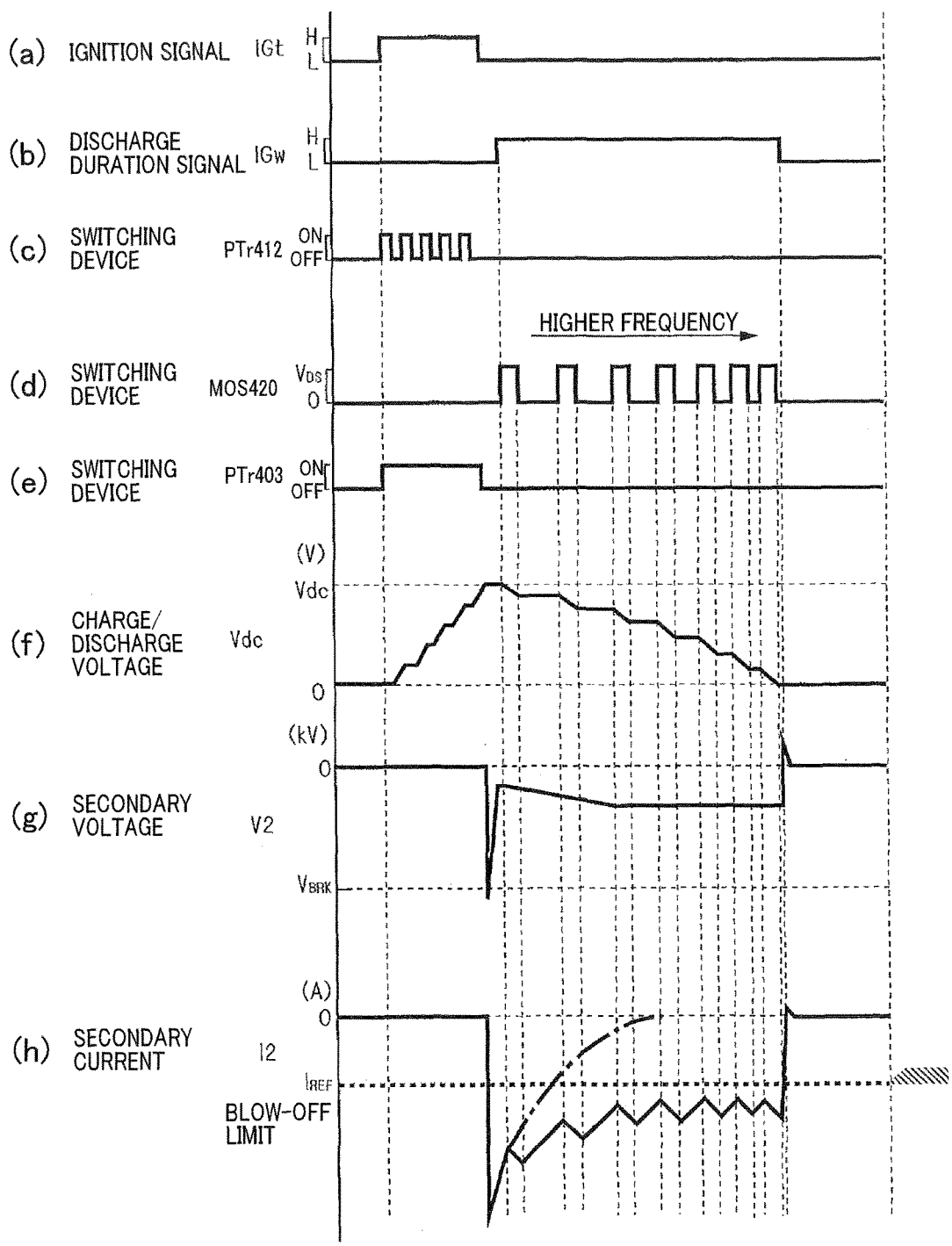
FIG. 12A is a time chart for explaining an operation of an ignition control apparatus of the fifth embodiment.

The ECU 406, as demonstrated in FIG. 12A(a), outputs the ignition signal IGt. The step-up switching device 412, as illustrated in FIG. 12A(c), starts to be on or off in synchronism with the rising of the ignition signal IGt. Simultaneously, the ignition device 403 is, as illustrated in FIG. 12A(e), turned on.

The turning on or off of the step-up switching device 412 causes the electric energy to be charged from the inductor 411 into the capacitor 415, so that the discharge voltage Vdc, as illustrated in FIG. 12A(f), rises gradually.

Driving of the step-up switching device 412 is stopped synchronously with the falling of the ignition signal IGt. When the ignition device 3 is closed simultaneously, it will cause, as illustrated in FIG. 12A(g), the high secondary voltage V2 to be developed at the secondary side of the ignition coil 404 and applied to the spark plug, thereby starting the discharge. The secondary current I2, as illustrated in FIG. 12A(h), then flows.

In the conventional spark ignition control apparatus, the secondary current I2, as indicated by a broken line in FIG. 12A(h), drops quickly, so that a discharge path between the electrodes is cut, and the secondary current I2 does not flow.

However, in this invention, the drive pulse signal $V_{GS}$ which switches, as illustrated in FIG. 12A(d), between the high and low levels at a given duty factor is developed between the gate and the source of the auxiliary device 420, as illustrated in FIG. 12A(b), synchronously with the rising of the discharge duration signal IGw.

The drive pulse signal $V_{GS}$ is, as illustrated in FIG. 12A(d), fixed in drive duty factor thereof and increased in drive frequency thereof toward the termination of the discharge between the start and the end of the discharge to control the open/close operation of the auxiliary device 420.

Therefore, the switching operation of the auxiliary device 420 causes, as shown in FIG. 12A(d), the capacitor 415 to be discharged and then stopped from being discharged cyclically, so that the charge/discharge voltage Vdc at the capacitor 415, as illustrated in FIG. 12A(f), changes the current flowing through the primary winding 440 of the ignition coil 404, which will be, as demonstrated in FIG. 12(h), added to the secondary current I2, thus maintaining the discharge for an increased period of time.

The discharge current I2 gradually decreases and reaches the blow-off limit current $I_{REF}$, thus increasing the probability of the blow-off of the discharge. The drive frequency for the auxiliary device 420 is, therefore, gradually increased between the start and the end of the discharge to shorten an interval at which the energy is outputted from the auxiliary device 402, thereby increasing the response rate of the output of the energy in order to prevent the discharge current I2 from dropping below the blow-off limit current $I_{REF}$. This avoids cutting of the discharge path to maintain the discharge until the discharge duration signal IGw falls.

The ignition control apparatus 407 works to increase the frequency when the energy stored in the capacitor 415 is inputted to the ignition coil 404 in a pulse form, thereby prolonging an input possible period of time at a late stage of the discharge where it is difficult to maintain the discharge until the flame blow-off does not occur.

The ignition control apparatus 407 also works to optimally change the drive frequency in order to prevent the secondary current I2 from dropping below the blow-off limit current $I_{REF}$ even in an energy stop period of time.

The ignition control apparatus 407 also works to set the energy input duty factor to be small around the start of the discharge because a change in current in the ignition coil is great, and there is a great margin to the blow-off limit current $I_{REF}$ and the ignition control apparatus 407 also sets the drive frequency to be high in order to enhance the ease of following a drop in current at the stop of the input of energy. The ignition control apparatus 407 then increases the duty factor from the middle stage of the discharge where the secondary current I2 decreases to near the blow-off limit current $I_{REF}$ to the late stage of the discharge for increasing the input energy in each cycle, and also increases the drive frequency to enhance the followability in order to keep the secondary current I2 above the blow-off limit current $I_{REF}$ for an increased period of time.

A problem caused by a case where the frequency calculating portion 210 that is the main part of the invention is not used will be described as the comparative example No. 1 with reference to FIG. 12B.

Figure 11:
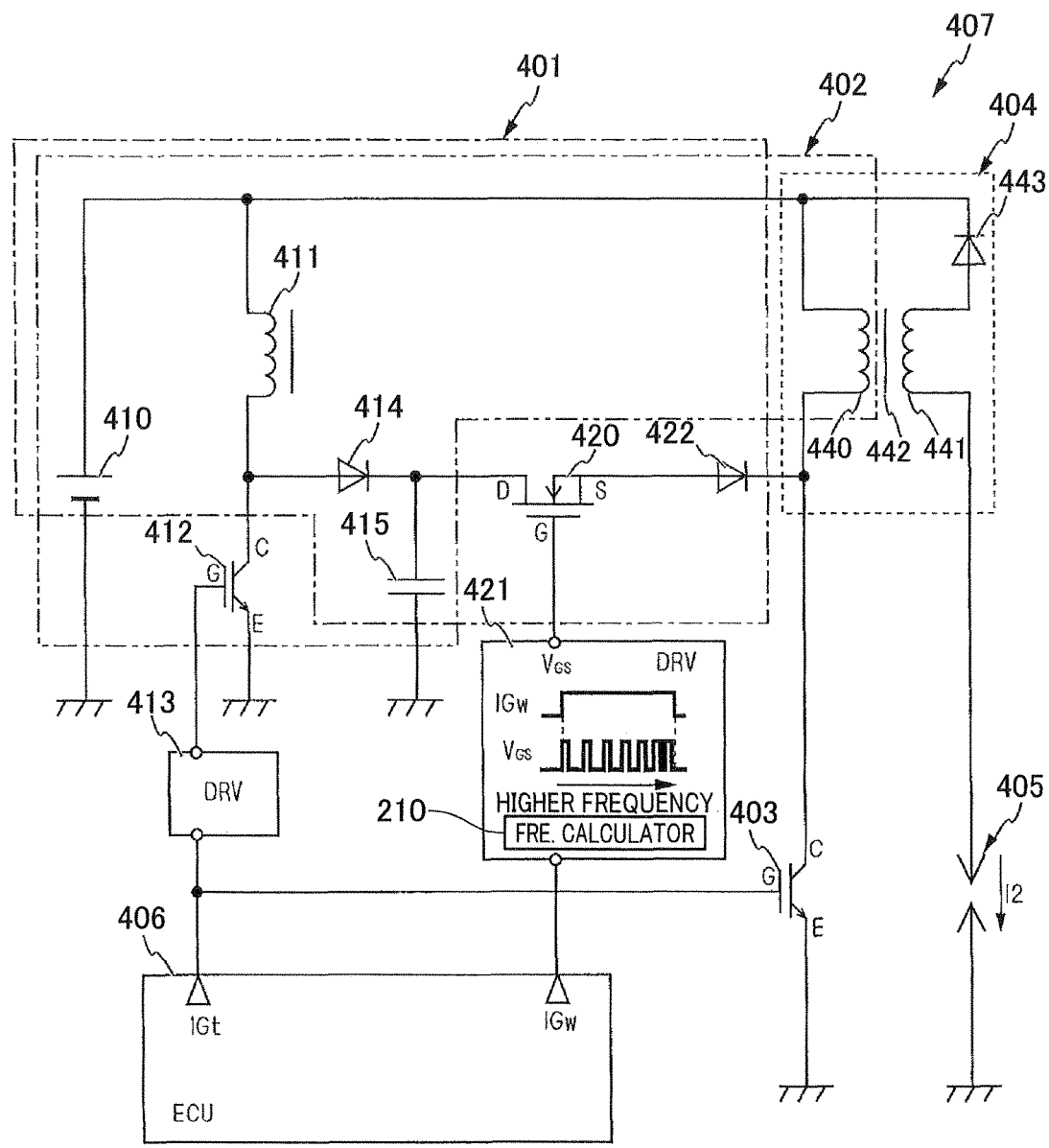
FIG. 11 is a schematic structural view of an ignition control apparatus in the fifth embodiment of the invention.

The comparative example No. 1 does not have the frequency calculating portion 210 and has a constant duty factor, like in the structure of FIG. 11 in the fifth embodiment, except that the energy is inputted from the auxiliary power supply 402 at a constant frequency.

In the comparative example No. 1, when the auxiliary device 420 is, as demonstrated in FIG. 12A(d), opened or closed by the drive pulse signal $V_{GS}$ outputted from the driver 421, it will cause the capacitor 415 to be discharged or stopped from being discharged cyclically, so that the discharged energy is inputted.

Figure 12B:
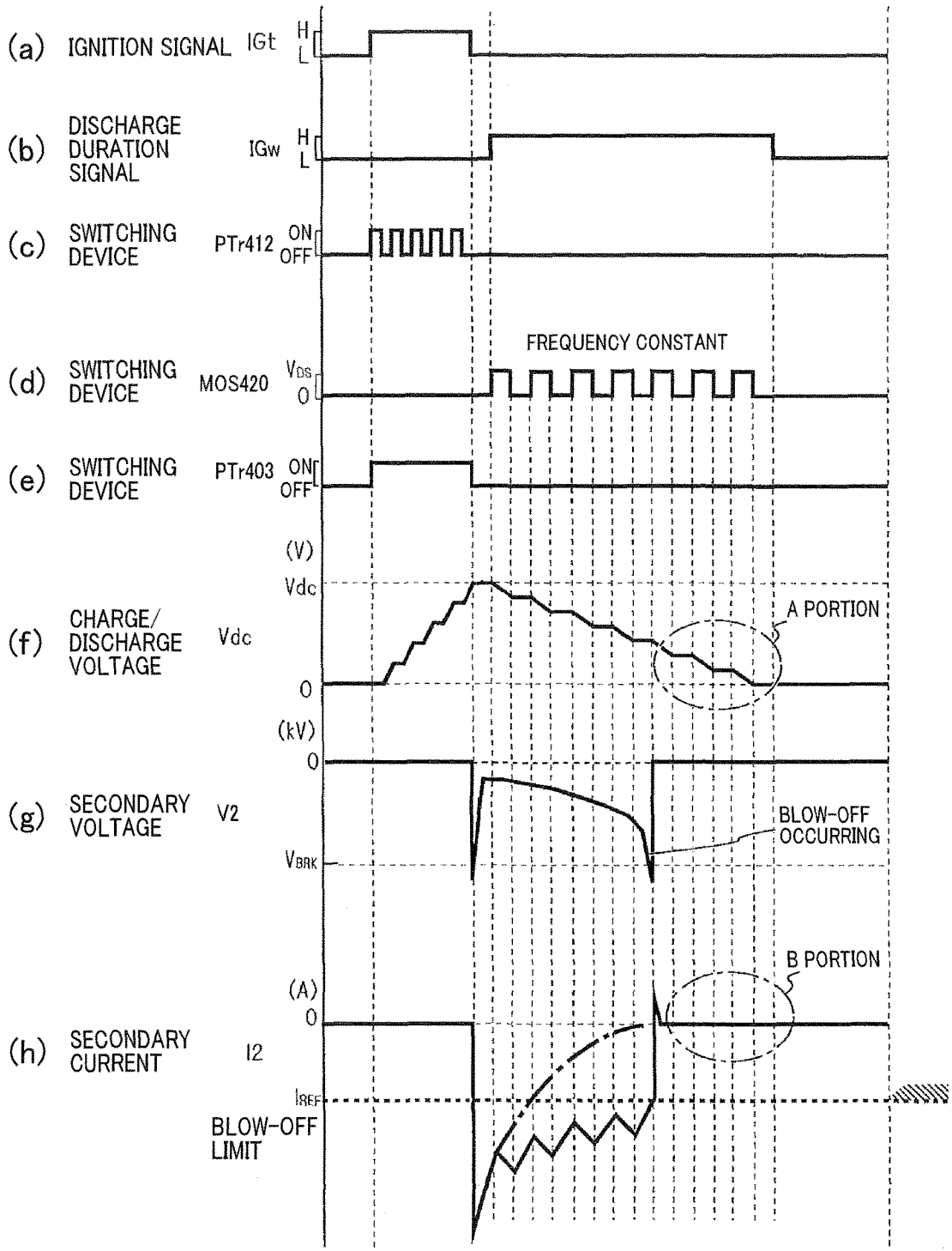
FIG. 12B is a time chart which represents an operation of an ignition control apparatus designed not to use a frequency calculating portion that is a main part of the invention which is illustrated as a comparative example No. 1.

However, the input of energy is as demonstrated in FIG. 12B(d), achieved at a constant frequency.

Consequently, in the first half of the discharge where the energy release from the ignition coil is great, even when less energy is inputted, the secondary current exceeds the blow-off limit current $I_{REF}$ to maintain the discharge after the input of energy is stopped, so that there is a low probability that flame blow-off occurs. However, in the second half from the middle stage of the discharge, the secondary current is near the blow-off limit current $I_{REF}$, thus causing the secondary current to drop below the blow-off limit current $I_{REF}$ after the stop of input of energy, which leads to a difficulty in maintaining the discharge.

We have, thus, found that even when the energy is inputted cyclically, as demonstrated in an A portion in FIG. 12B(f), the discharge, as illustrated in a B portion in FIG. 12B(h), has ended, so that the input energy is wasted.

This may lead to a difficulty in maintaining the discharge desirably, resulting in instability in igniting the mixture when a strong gas flow is occurring in the combustion chamber or in a condition where the ignitability of the mixture is low in a very lean-burn mode.

How to calculate the drive frequency for the auxiliary device 420 in the frequency calculating portion 210 will be described below with reference to FIGS. 13A, 13B, 13C, and 13D.

The map data illustrated in FIG. 13A is stored in the frequency calculating portion 210 or the ECU 406 to calculate the rate of increase in frequency as a function of running conditions of the internal combustion engine 11 derived from the engine parameters EPr.

For instance, when the engine speed Ne is low, and the intake pressure PIN is also low, it is easy to ignite the mixture. The duty factor is kept constant. The rate of increase in frequency is set to a lower value.

Conversely, when the engine speed Ne is high, and the intake pressure PIN is also high, it is difficult to ignite the mixture. The duty factor is kept constant. The rate of increase in frequency is set to a higher value.

A one example of a control operation of the ignition control apparatus will be discussed with reference to FIG. 13B.

In an ignition signal determination process in step S100, it is determined whether there is the ignition signal IGt or not. A YES answer is obtained when the ignition signal IGt is inputted. The routine then proceeds to step S110. A NO answer is obtained, that is, the routine repeats step S100 until the ignition signal IGt is inputted.

In an ignition switching device drive process in step S110, the ignition switching device 403 is turned on synchronously with the rising of the ignition signal IGt.

In a step-up switching device drive process in step S120, the step-up switching device 412 starts to be opened or closed synchronously with the rising of the ignition signal IGt.

In an ignition signal stop determination process in step S130, it is determined whether the ignition signal IGt is stopped from being outputted or not.

If the ignition signal IGt is in the on-state, a NO answer is obtained. The ignition switching device 403 is, thus, kept on to continue to cyclically open or close the step-up switching device 412.

When the ignition signal IGt is turned off, a YES answer is obtained. The routine then proceeds to step S140.

In an ignition switching device stop process in step S140, the ignition switching device 403 is turned off synchronously with the falling of the ignition signal IGt.

In a step-up switching device stop process in step S150, the step-up switching device 412 is stopped synchronously with the falling of the ignition signal IGt.

In parallel to steps S100 to S150, steps S160 and S170 are executed.

In a frequency calculating process in step S160, the frequency calculating portion 210 determines the optimum drive frequency as a function of the running conditions derived based on the engine parameters EPr.

In a rate-of-frequency increase calculating process in step S170, the rate of increase in frequency is determined from the frequency calculated in step S160.

In a discharge duration signal determination process in step S180, it is determined whether there is the discharge duration signal IGw or not. A NO answer is obtained until the discharge duration signal IGw rises. The routine then repeats step S180. When the discharge duration signal IGw is turned on, a YES answer is obtained. The routine then proceeds to step S190.

In an auxiliary switching device drive process in step S190, the auxiliary switching device 420 starts to be opened or closed synchronously with the rising of the discharge duration signal IGw.

The switch drive pulse for the auxiliary switching device 420 is increased or decreased at the rate of increase in frequency determined in step S170.

In a discharge duration signal stop process in step S200, it is determined whether the discharge duration signal IGw is stopped or not. The auxiliary switching device 420 continues to be opened or closed cyclically to supply the energy through the auxiliary power supply 402 until the discharge duration signal IGw is stopped.

When the discharge duration signal IGw is stopped, a YES answer is obtained. The routine proceeds to step S210.

In an auxiliary switching device stop process in step S210, the auxiliary switching device 420 is stopped from being opened or closed cyclically synchronously with the falling of the discharge duration signal IGw to stop supplying the energy from the auxiliary power supply 402.

The ignition control apparatus 407 is controlled to gradually increase the drive frequency at the rate of increase, as determined by the engine parameters, between the start and the end of discharge.

The drive duty factor may be increased when the frequency is calculated to be decreased, while it may be attenuated when the frequency is calculated to be increased.

In the above case, drive signals whose frequencies are different from each other may be switched synchronously with the falling of the drive pulse to gradually increase the frequency with the drive duty being kept constant, so that an interval of the input of energy becomes shorter as approaching the end of the discharge duration.

The discharge may be continued, as illustrated in FIG. 13C, by setting the frequency to be lower immediately after the start of discharge and then higher at a discharge middle stage where the secondary current I2 approaches a given threshold I2th (i.e., a blow-off limit current threshold value) and a final stage of discharge to accelerate the input of energy in response to a change in coil current for preventing the secondary current I2 from dropping below the threshold I2th at the stop of the input of energy.

The frequency may be increased or decreased quickly by changing a value of the resistor R3 that is one of resistors installed in the astable multivibrator illustrated in FIG. 13D to one of, for example, Ra, Rb, Rc, and Rd which is selected through a switch to change the time constant.

The frequency switching means is not limited to the one in this embodiment, but may be implemented by a known frequency selector.

Figure 14:
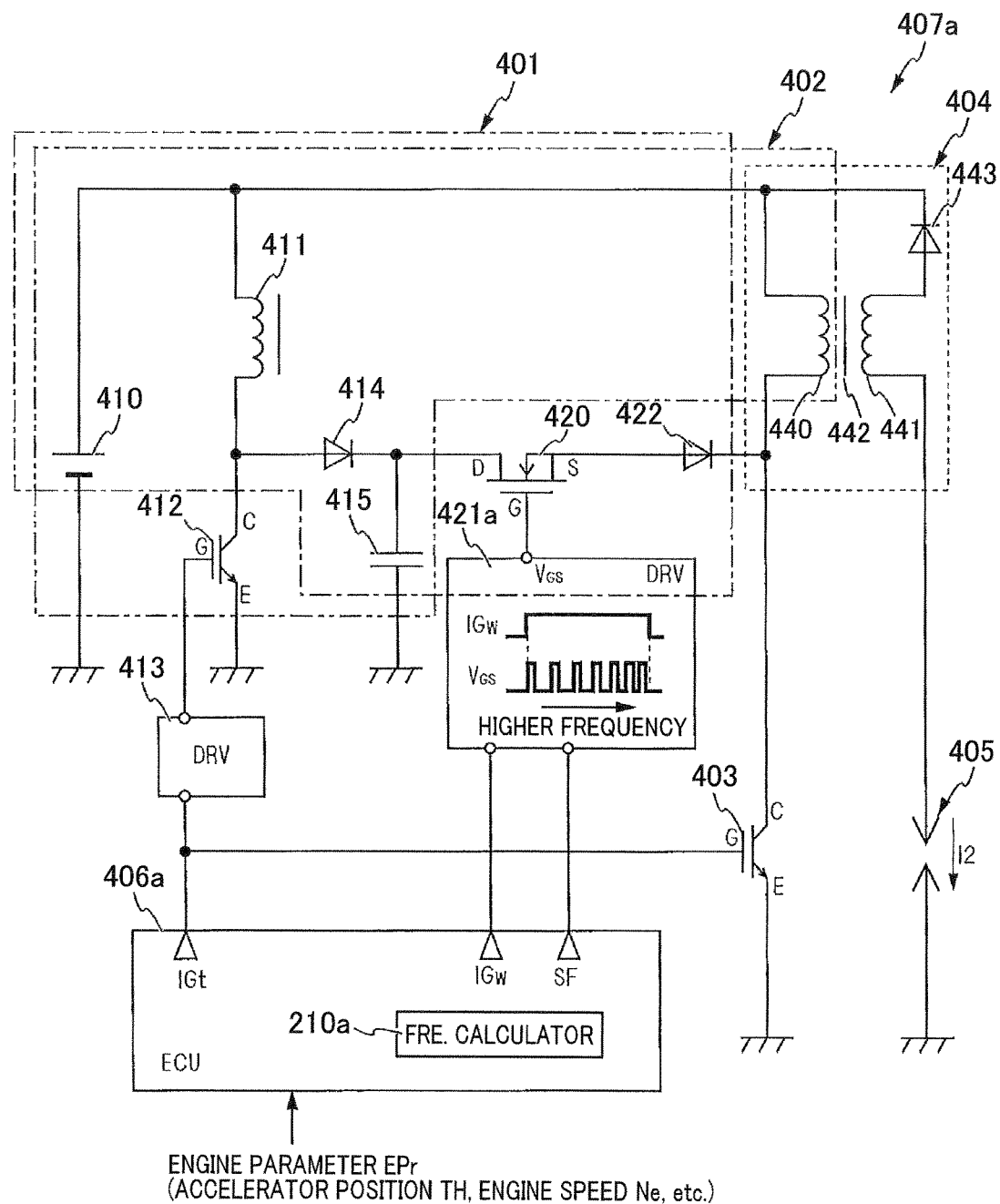
FIG. 14 is a schematic structural view of an ignition control apparatus in the sixth embodiment of the invention.

The ignition control apparatus 407a in the sixth embodiment of the invention will be described below with reference to FIG. 14. The same reference numbers as employed in the above embodiment will refer to the same parts. Alphabetical sub-numbers are affixed to different parts. Explanation of the same parts will be omitted here. Only distinguishing parts will be referred to below.

In the above fifth embodiment, the frequency calculating portion 210 is installed in the driver 421, but, this embodiment is different therefrom in that the frequency calculating portion 210 is disposed in the ECU 406 and works to transmit a result of calculation, that is, a frequency signal SF which determines the drive frequency to the driver 421a.

With the above arrangements, data transmitted between the ECU 406 and the calculating portion 210a is simplified.

In this embodiment, the energy input is, like in the above embodiment, achieved sufficiently by the auxiliary power supply 402 as a function of the running condition of the internal combustion engine 11, thereby ensuring the stability in igniting the mixture and saving electric power.

Figure 15:
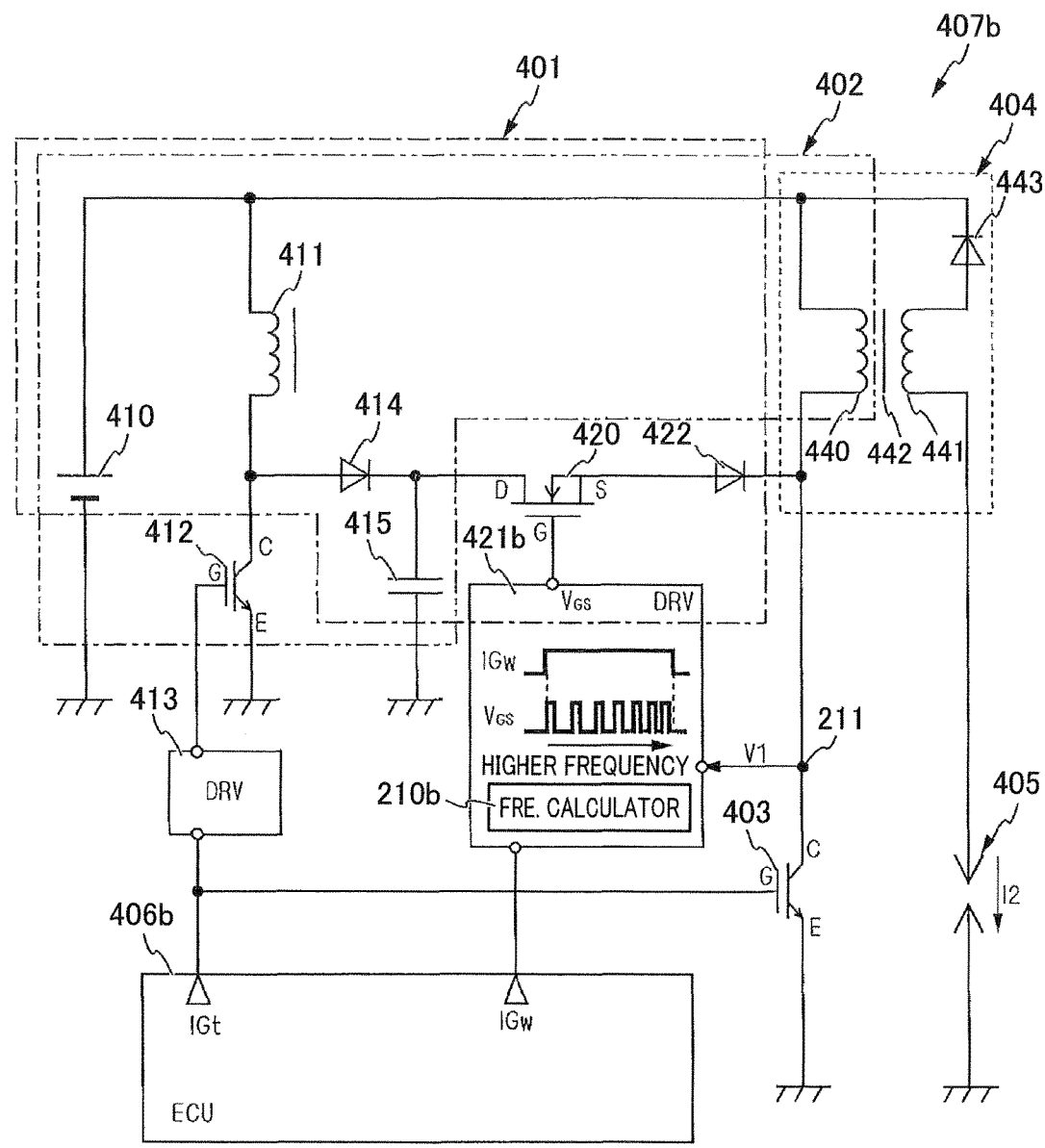
FIG. 15 is a schematic structural view of an ignition control apparatus in the seventh embodiment of the invention.

The ignition control apparatus 407b in the seventh embodiment of the invention will be described below with reference to FIG. 15.

In the fifth and sixth embodiments, the engine parameters Epr are derived from an external running condition determining means not shown such as an engine speed sensor, an intake pressure sensor, an accelerator position sensor, a crank angle sensor, an engine coolant temperature sensor, etc. This embodiment is different from the above embodiment in that the primary voltage detecting means 211 is provided which detects the primary voltage V1 at the ignition coil 404 to calculate a change in secondary voltage V2 as a function of the primary voltage V1, and feeds it back to the frequency calculating portion 210b to calculate the rate of increase in frequency.

This embodiment offers the same beneficial effects as in the fifth and sixth embodiments.

The above described ignition control apparatuses are basically designed to decrease the rate of increase in the drive pulse frequency for the auxiliary switching device 420 with the drive duty factor kept constant as the speed of the internal combustion engine 11 or the load on the internal combustion engine 11 decreases, increase the rate of increase in the drive pulse frequency for the auxiliary switching device 420 as the speed of the internal combustion engine 11 or the load on the internal combustion engine 11 increases, and increase the frequency of the drive pulse for driving the auxiliary switching device 420 as the termination of the discharge is approached within a discharge period of time between the start and end of the discharge, but however, is not limited to the above embodiments, but may be embodied in various ways without departing from the principle of the invention that the input energy provided by the auxiliary power supply 402 is increased at the end side of the discharge.

For instance, the duty factor needs not necessarily be fixed, but may be increased or decreased in addition to increasing the drive frequency early and setting it to be higher at the end side of the discharge where the flame blow-off occurs easily in order to minimize the probability of the flame blow-off occurring in a condition where the engine speed is high, and the engine load is high.

In other words, the duty factor and the frequency may be decreased with a decrease in load on the internal combustion engine 11, while it may be increased with an increase in load on the internal combustion engine 11.

The duty factor may be set optionally in combination with altering the frequency in order to create the same beneficial effects.

Other modifications which are not referred to are within a technical scope as long as the essential parts of the invention are not changed. Elements constituting means for solving the problem of the invention which are expressed in an operational or functional form contain all possible arrangements capable of realizing the arrangements disclosed in the above embodiment and modifications or equivalents thereof.

The invention claimed is:

1. An ignition control apparatus engineered to control operation of a spark plug provided to ignite an air-fuel mixture within a cylinder of an internal combustion engine, comprising:
    an ignition coil which is equipped with a primary winding and a secondary winding and designed so that a primary current that is an electric current flowing through said primary winding is increased or decreased to develop a secondary current in said secondary winding connected to said spark plug;
    a dc power supply with a non-grounding output terminal connected to an end of said primary winding to have said primary current flow through said primary winding;
    a first switching device that is a semiconductor switching device which is equipped with a first control terminal, a first power supply terminal, and a first grounding terminal and works to establish or block electric communication between said first power supply terminal and said first grounding terminal based on a first control signal inputted to said first control terminal, said first power supply terminal being connected to an other end of said primary winding, said first grounding terminal being connected to a ground side;
    a second switching device that is a semiconductor switching device which is equipped with a second control terminal, a second power supply terminal, and a second grounding terminal and works to establish or block electric communication between said second power supply terminal and said second grounding terminal based on a second control signal inputted to said second control terminal, said second grounding terminal being connected to said other end of said primary winding,
    a third switching device that is a semiconductor switching device which is equipped with a third control terminal, a third power supply terminal, and a third grounding terminal and works to establish or block electric communication between said third power supply terminal and said third grounding terminal based on a third control signal inputted to said third control terminal, said third power supply terminal being connected to said second power supply terminal of said second switching device, said third grounding terminal being connected to said ground side;
    an energy storage coil that is an inductor disposed in a power line connecting between said non-grounding output terminal of said dc power supply and said third power supply terminal of said third switching device, said energy storage coil working to store energy when said third switching device is turned on and discharge the energy when said third switching device is turned off;
    a capacitor which is connected in series with said energy storage coil between said non-grounding output terminal of said dc power supply and said ground side, said capacitor working to store the energy released from said energy storage coil when said third switching device is turned off; and
    a controlling portion is programmed to:
        control the second switching device and said third switching device,
        turn off said third switching device and turn on said second switching device during discharge of a spark from said spark plug, as initiated upon turning off of said first switching device, to release the energy from said capacitor which is in turn supplied to said primary winding through said other end, thereby cause said primary current to flow through said primary winding, and variably set a duty factor of said second control signal.

2. An ignition control apparatus as set forth in claim 1, wherein said controlling portion is programmed to set said duty factor as a function of a running condition of said internal combustion engine.

3. An ignition control apparatus as set forth in claim 2, wherein said running condition of said internal combustion engine contains at least an engine speed.

4. An ignition control apparatus as set forth in claim 1, wherein said controlling portion is further programmed to variably set said duty cycle in one combustion cycle.

5. An ignition control apparatus as set forth in claim 4, wherein said controlling portion is further programmed to increase said duty factor with time.

6. An ignition control apparatus as set forth in claim 5, wherein said controlling portion is further programmed to variably set a rate of increase in said duty factor with time.

7. An ignition control apparatus for igniting an internal combustion engine which at lease comprises:
    a dc power supply;
    a step-up circuit which steps up a power supply voltage at said dc power supply;
    an ignition coil which develops a high secondary voltage at a secondary winding by an increase or a decrease in current flowing in the primary winding connected to said step-up circuit;
    an ignition switching device which switches between supply and cutoff of current to said primary winding;
    a spark plug which is connected to said secondary winding and produces a spark discharge upon application of secondary voltage from said secondary winding, and
    an auxiliary power supply which additionally performs ignition switching device discharge from said step-up circuit and stop the ignition switching device discharge after said spark plug is started by opening or closing of said ignition switching device to discharge the spark plug, thereby increasing current flowing through said secondary winding,
    wherein said auxiliary power supply is equipped with an auxiliary switching device which switches between input of energy from said auxiliary power supply and stop thereof, said auxiliary switching device includes a soft-off circuit which is configured to set a turning off speed to be slower than a turning on speed, and
    wherein the input of energy from said auxiliary power supply is applied to said primary winding from a low voltage side thereof.

8. An ignition control apparatus as set forth in claim 7, further comprising an auxiliary device driver configured to open or close said auxiliary switching device one time or a plurality of times according to a discharge duration signal which instructs to start and stop the input of energy from said auxiliary power supply.

9. An ignition control apparatus as set forth in claim 7, wherein said soft-off circuit includes one or a plurality of soft-off capacitors connected between a gate and a source of said auxiliary switching device.

10. An ignition control apparatus as set forth in claim 7, wherein said soft-off circuit is a driver and is configured to slowly decrease a drive voltage for driving said auxiliary switching device.

11. An ignition control apparatus as set forth in claim 7, wherein said step-up circuit is made up of an energy storage inductor which is connected to said dc power supply, a switching device which switches between supply and cut of current to said inductor in a given cycle only for a given period of time according to said ignition signal, a capacitor which is connected in parallel to said inductor, and a first rectifying device which rectifies current from said inductor to said capacitor.

12. An ignition control apparatus as set forth in claim 11, wherein said auxiliary power supply is made up of an auxiliary switching device which is disposed between said capacitor and said primary winding and configured to switch between discharge from said capacitor and stop of the discharge from said capacitor, a second rectifying device which rectifies current from said capacitor to said primary winding, said dc power supply, said inductor, and said capacitor.

13. An ignition control apparatus for igniting an internal combustion engine which at lease comprises:
    a dc power supply;
    a step-up circuit which steps up a power supply voltage at said dc power supply;
    an ignition coil which develops a high secondary voltage at a secondary winding by an increase or a decrease in current flowing in the primary winding connected to said step-up circuit;
    an ignition switching device which switches between supply and cutoff of current to said primary winding according to an ignition signal outputted as a function of a running condition of the internal combustion engine;
    a spark plug which is connected to said secondary winding and produces a spark discharge upon application of secondary voltage from said secondary winding,
    an auxiliary power supply which additionally performs discharge from said the step-up circuit to a junction between the primary winding of the ignition coil and the ignition switching device and then stop the discharge, thereby increasing current through said secondary winding in a discharge period of time after start of discharge from said spark plug made by opening or closing said ignition switching device, wherein said auxiliary power supply is equipped with an auxiliary switching device which switches between discharge from said auxiliary power supply and stop of the discharge, an auxiliary switching device driving circuit which opens or closes the auxiliary switching device, and
    a frequency calculating portion configured to increase or decrease a drive frequency for said auxiliary switching device,
    said frequency calculating portion is configured to decrease a rate of increase in drive pulse frequency for said auxiliary switching device as a speed of the internal combustion engine decreases while keeping a drive duty factor for driving said auxiliary switching device, and alternatively to increase the rate of increase in the drive pulse frequency as the speed of the internal combustion engine increases while keeping the drive duty factor.

14. An ignition control apparatus as set forth in claim 13, wherein said calculating portion is configured to decrease or increase the rate of increase in drive pulse frequency for said auxiliary switching device based on at least one of an intake pressure, an accelerator position, a crank angle, an engine coolant temperature, an EGR rate, an air-fuel ratio, a primary voltage at the ignition coil, a secondary voltage at the ignition coil, and a secondary current in the ignition coil in addition to the speed of the internal combustion engine.

15. An ignition control apparatus as set forth in claim 14, wherein said drive duty factor is increased when the frequency is decreased and attenuated when the frequency is increased.

16. An ignition control apparatus as set forth in claim 13, wherein in said discharge period of time between start of discharge and end of the discharge, a frequency of a drive pulse for driving said auxiliary switching device is increased toward the end of the discharge.

17. An ignition control apparatus as set forth in claim 13, wherein the input of energy from said auxiliary power supply is performed to said primary winding.

18. An ignition control apparatus as set forth in claim 13, wherein said step-up circuit is made up of an energy storage inductor which is connected to said dc power supply, a switching device which switches between supply and cut of current to said inductor in a given cycle only for a given period of time according to said ignition signal, a capacitor which is connected in parallel to said inductor, and a first rectifying device which rectifies current from said inductor to said capacitor.

19. An ignition control apparatus as set forth in claim 18, wherein said auxiliary power supply is made up of an auxiliary switching device which is disposed between said capacitor and said primary winding and configured to switch between discharge from said capacitor and stop of the discharge from said capacitor, a second rectifying device which rectifies current from said capacitor to said primary winding, said dc power supply, said inductor, and said capacitor.

* * * * *